United States Patent
Saito et al.

(10) Patent No.: US 8,033,915 B2
(45) Date of Patent: Oct. 11, 2011

(54) GAME SYSTEM, SERVER APPARATUS AND REGISTER TERMINAL

(75) Inventors: Hajime Saito, Tokyo (JP); Osamu Migitera, Tokyo (JP); Hotaru Komatsu, Tokyo (JP); Chihiro Inoue, Tokyo (JP); Kazuyasu Kawamura, Tokyo (JP); Takao Tada, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1664 days.

(21) Appl. No.: 10/660,472

(22) Filed: Sep. 11, 2003

(65) Prior Publication Data

US 2004/0092313 A1    May 13, 2004

(30) Foreign Application Priority Data

Sep. 11, 2002    (JP) .................................. 2002-265487

(51) Int. Cl.
*A63F 13/00*    (2006.01)

(52) U.S. Cl. .......................................... 463/42; 463/43

(58) Field of Classification Search ............... 463/40–43, 463/29
See application file for complete search history.

(56) References Cited

U.S. PATENT DOCUMENTS

| | | | | |
|---|---|---|---|---|
| 5,018,736 A * | 5/1991 | Pearson et al. | .................. | 463/29 |
| 5,292,125 A * | 3/1994 | Hochstein et al. | ............... | 463/41 |
| 5,593,349 A * | 1/1997 | Miguel et al. | .................. | 463/30 |
| 5,890,963 A * | 4/1999 | Yen | ................................. | 463/42 |
| 6,080,064 A * | 6/2000 | Pieterse et al. | .................. | 463/42 |
| 6,132,315 A * | 10/2000 | Miyamoto et al. | ............... | 463/43 |
| 6,152,824 A * | 11/2000 | Rothschild et al. | ............. | 463/42 |
| 6,352,479 B1 * | 3/2002 | Sparks, II | ........................ | 463/42 |
| 6,758,746 B1 * | 7/2004 | Hunter et al. | ..................... | 463/9 |
| 2002/0049729 A1 | 4/2002 | Umekawa | | |

FOREIGN PATENT DOCUMENTS

| | | |
|---|---|---|
| EP | 1 160 747 A2 | 5/2001 |
| JP | 09-062812 | 3/1997 |
| JP | 11-066008 | 3/1999 |
| JP | 11-088347 | 3/1999 |
| JP | 2000288239 | 10/2000 |
| JP | 2001-120841 | 5/2001 |
| JP | 2001-136583 | 5/2001 |
| JP | 2001-204971 | 7/2001 |
| JP | 2001-204974 | 7/2001 |
| JP | 2001-224862 | 8/2001 |
| JP | 2001-224863 | 8/2001 |

(Continued)

OTHER PUBLICATIONS

Madden 2003 Game Manual www.replacementdocs.com.*

(Continued)

*Primary Examiner* — David L Lewis
*Assistant Examiner* — Eric M Thomas
(74) *Attorney, Agent, or Firm* — Edwards Angell Palmer & Dodge LLP; Peter C. Schechter; Brain R. Landry

(57) ABSTRACT

Each of game machines sends result information indicating an individual ID and play result to a server. The server has a common ID control file and an individual game control file, which store common points, a common ID and an individual ID, associated with each other. A CPU converts the result information into common points, and allows the converted common points to be reflected in the common points in the common ID control file corresponding to the individual ID.

18 Claims, 18 Drawing Sheets

FOREIGN PATENT DOCUMENTS

| | | |
|---|---|---|
| JP | 2001-300130 | 10/2001 |
| JP | 2001-327749 | 11/2001 |
| JP | 2001-327760 | 11/2001 |
| JP | 2001-340656 A1 | 12/2001 |
| JP | 2002-028374 | 1/2002 |
| JP | 2002000908 A | 1/2002 |
| JP | 2002-035428 | 2/2002 |
| JP | 2002-035434 | 2/2002 |
| JP | 2002-083204 | 3/2002 |
| JP | 2002074167 | 3/2002 |
| JP | 2002-095860 A1 | 4/2002 |
| JP | 2002123651 | 4/2002 |
| JP | 2002-197389 A1 | 7/2002 |
| JP | 2002210183 A | 7/2002 |
| JP | 2002216000 | 8/2002 |
| KR | 1020010016143 A | 3/2001 |

OTHER PUBLICATIONS

Patent Abstracts of Japan for JP2001-340656 published on Dec. 11, 2001.
Patent Abstracts of Japan for JP2002-095860 published on Apr. 2, 2002.
Patent Abstracts of Japan for JP2002-197389 published on Jul. 12, 2002.
Patent Abstracts of Korea for KR1020010016143 published on Mar. 5, 2001.
Patent Abstracts of Japan for JP2001-204974 published on Jul. 31, 2001.
Patent Abstracts of Japan for JP2002-028374 published on Jan. 29, 2002.
Patent Abstracts of Japan for JP2001-224862 published on Aug. 21, 2001.
Patent Abstracts of Japan for JP2001-224863 published on Aug. 21, 2001.
Patent Abstracts of Japan for JP2001-300130 published on Oct. 30, 2001.
Patent Abstracts of Japan for JP09-062812 published on Mar. 7, 1997.
Patent Abstracts of Japan for JP11-066008 published on Mar. 9, 1999.
Patent Abstracts of Japan for JP2001-120841 published on May 8, 2001.
Patent Abstracts of Japan for JP2001-136583 published on May 18, 2001.
Patent Abstracts of Japan for JP2001-204971 published on Jul. 31, 2001.
Patent Abstracts of Japan for JP2001-327749 published on Nov. 27, 2001.
Patent Abstracts of Japan for JP2001-327760 published on Nov. 27, 2001.
Patent Abstracts of Japan for JP2002-035428 published on Feb. 5, 2002.
Patent Abstracts of Japan for JP2002-035434 published on Feb. 5, 2002.
Patent Abstracts of Japan for JP2002-083204 published on Mar. 22, 2002.

* cited by examiner

FIG. 2

Table 51:

| COMMON ID | PASSWORD | COMMON POINTS | INDIVIDUAL ID | | | | USER INFORMATION |
|---|---|---|---|---|---|---|---|
| | | | MUSIC GAME | MAH-JONG GAME | ACTION GAME | ... | |
| asdfghjkl | popo | 250 | A543781 | B882857 | A123456 | ... | ... |
| qwertyui | mari | 390 | A951154 | — | C125879 | ... | ... |
| zxcvbnmq | koma | 350 | A123333 | B655123 | — | ... | ... |
| ... | ... | ... | ... | ... | ... | ... | ... |

Table 52A:

| INDIVIDUAL ID | PERSONAL INFORMATION |
|---|---|
| A123333 | P001 |
| A123456 | P003 |
| A154789 | P005, P006, P011 |
| ... | ... |

Table 52B:

| INDIVIDUAL ID | PERSONAL INFORMATION |
|---|---|
| B655123 | T01 (REACH DECLARING STICKS), ... |
| B775544 | T08 (SEE-THROUGH GLASSES), ... |
| B549836 | T04 (WALLPAPER1), T05 (WALLPAPER2)... |
| ... | ... |

FIG. 9A

| COMMON ID | PASS WORD | COMMON POINTS | INDIVIDUAL ID ||||
|---|---|---|---|---|---|---|
| | | | MUSIC GAME | MAH-JONG GAME | ACTION GAME | ... |
| tyuilkjh | piok | 100 | A123456 | – | – | ... |

FIG. 9B

| COMMON ID | PASS WORD | COMMON POINTS | INDIVIDUAL ID ||||
|---|---|---|---|---|---|---|
| | | | MUSIC GAME | MAH-JONG GAME | ACTION GAME | ... |
| tyuilkjh | piok | 100 | A123456 | B775544 | – | ... |

| COMMON ID | PASS WORD | COMMON POINTS | INDIVIDUAL ID | | | |
|---|---|---|---|---|---|---|
| | | | MUSIC GAME | MAH-JONG GAME | ACTION GAME | ... |
| zxcvbnmp | koma | 350 | A123333 | – | – | ... |

| COMMON ID | PASS WORD | COMMON POINTS | INDIVIDUAL ID | | | |
|---|---|---|---|---|---|---|
| | | | MUSIC GAME | MAH-JONG GAME | ACTION GAME | ... |
| zxcvbnmp | koma | 150 | A123333 | B655123 | – | ... |

| INDIVIDUAL ID | PERSONAL INFORMATION |
|---|---|
| A123333 | P001 |

| INDIVIDUAL ID | PERSONAL INFORMATION |
|---|---|
| A123333 | P001, P123 |

GAME SYSTEM, SERVER APPARATUS AND REGISTER TERMINAL

BACKGROUND OF THE INVENTION

1. Field of the Invention

The present invention relates to a game system comprising a plurality of game machines and servers.

2. Description of the Related Art

Game machines capable of being connected with servers are in widespread use with the improvement of communication networks, such as the Internet. From the game machines like that, players can sometimes buy some items, for example clothes of a character appearing in the game with points given in accordance with the result of the game.

However, as the existing game system is constructed independently by every kind of game, with the points a player getting in a certain game, the player can't buy any items appearing in the other games. In other words, the existing points are given in accordance with the result of a certain game, but the scope of use is limited to that game.

SUMMARY OF THE INVENTION

The present invention has been developed in view of the above situation and has the issue to provide a game system using points capable of being used through numerous different games, and server machine and resister terminal used in the game system.

The present invention will now be described below.

A game system according to the present invention comprises plurality of game machines and a server being prepared for the game machines. Each of the game machines is capable of playing different kinds of games from each other. Each of the game machines comprising a first sending device for sending sending-information including identification-information to identify a user. The server comprises a point storage device for storing the identification-information and points so as to be corresponded with each other, the points being given in accordance with contents of user's playing in each game on each of the game machines and having a trading value unified thorough the games, a trading device for trading the points for any one of a plurality of unique datas, each of which is used uniquely in any one of the games, and a second sending device for sending the traded unique data. Each of the game machines or the server comprises a converting device for converting play-information indicating the contents of user's playing in each game on each of the game machines into the points.

According to this game system, points used in various kinds of games are controlled associated with identification-information, the contents of user's playing various games are converted to points, and the converted points can be reflected in the control contents. Therefore, when a player plays a certain game, the player can accumulate points having the trading value for data used in other games. The unique data may be any data so long as it describes game elements giving changes in the game, and for example, the data may be music data or image data directly used in the game, instruction data for making the game elements held by the game machine itself effective, or a program module applied to the game. The contents of user's playing include elements relating to the contents the user has played each game, such as scores as a result of playing the game (play result), the number of plays, the number of cleared stages, and lost points in a disadvantageous situation.

When the converting device is mounted on the game machines each, the sending-information includes the points. When the converting device is mounted on the server, the sending-information includes the play-information. The function for converting the play-information to the points may be included in the game machine or the server. When the game machine has this function, the processing load of the server can be reduced. On the other hand, when the server has this function, correspondence between the play-information and the points can be converted easily.

The server may comprise a data storage device for storing user available data that the identification-information and at least one of the plurality of unique datas available to the user are associated with each other, and a storage control device for, when the server receives a trading request to trade any one of the plurality of unique datas together with the identification-information, updating the points, corresponding to the received identification-information in the point storage device, to a value obtained by subtracting points corresponding to the unique data to be traded. The trading device may allow the unique data to be traded to be reflected in the user available data corresponding to the received identification-information in the data storage device. According to this invention, the identification-information and the data can be associated with each other according to the trading request, and the points corresponding to the unique data can be subtracted from the points held by the user. The user available data stored in the data storage device may be formed by the identification-information and codes each designating available unique data associated with the identification-information, when the unique datas are stored in another storage device.

The point storage device may further store authentication information for verifying the user in association with the identification-information and the points. The trading device and the storage control device updates the points stored in the point storage device and the user available data stored in the data storage device according to the trading request, in the case where the user is authenticated as a proper user based on the authentication information. According to this invention, since update of the stored contents is carried out on condition of the authentication, the security can be improved. The authentication information may be, for example, biological information such as fingerprints as well as passwords.

When any one of designating informations, each of which designates any one of the plurality of unique datas and the identification-information, sent in association with each other from the game machine to the server, in the case where the user available data that the unique data designated by the sent designating information is associated with the sent identification-information is stored in the data storage device, the second sending device may send the designated unique data to the game machine. In this case, data available to the user can be downloaded to the game machine.

More specifically, the data storage device may comprise a first storage device for storing the plurality of unique datas and the designating informations each of which designates each of the plurality of unique datas so to be associated with each other, and a second storage device for storing the designating informations, each of which designates the unique data available to the user among the designating informations stored in the first storage device, and the identification-information so as to be associated with each other. When the server receives the identification-information from the game machine, the second sending device may read the designating informations stored in association with the received identification-information from the second storage device and sends the read designating informations to the game machine, and, when the server receives a designating information selected among the sent designating informations from the game machine, the second sending device may read the unique data stored in association with the received designating information from the first storage device and sends the read unique data to the game machine.

According to this invention, since the designating information for designating the unique data, which is now available to a player who has traded it, is sent prior to the download of the unique data, the player can know of the unique data available to the player. After the player selects the unique data, the unique data is downloaded. As a result, the communication resources can be used effectively.

It is desired that when the server receives a donation request including the identification-information of a sender, the identification-information of a receiver, and points to be donated from the sender to the receiver, the storage control device subtracts the points to be donated from the points stored in the point storage device in association with the identification-information of the sender, and adds the points to be donated to the points stored in the point storage device in association with the identification-information of the receiver. According to this invention, donation of points between players becomes possible.

It is desired that the server comprises a notification device for notifying a user to be the receiver of donation, when the storage control device updates the points stored in the point storage device according to the donation request. According to this invention, the player to be the receiver can know of the donation of the points.

More specifically, the notification device preferably comprises a generation device for generating a mail notifying the donation of the points, a mail storage device for storing the mail associated with the identification-information of the receiver, and a mail sending device, which upon reception of the identification-information to be sent when the user plays the game, from the game machine, reads out the mail stored associated with the identification-information of the receiver, which agrees with the received identification-information by searching the mail storage device, and sends the mail to the game machine. In this case, the mail can be sent by using the game system, without using an existing electronic mail system, and the player, being the receiver, can know of the donation, at the time of using the game machine for the first time after the donation.

Moreover, the identification-information is an individual identification-information to identify the user for each kind of the games. The data storage device comprises an individual storage device controlled for each kind of the games, and the individual storage device stores individual available data that the individual identification-information and at least one of the plurality of unique datas available to the user are associated with each other. When the server receives a common identification-information issuing request including common identification-information to link the individual identification-informations corresponding to a same user and the individual identification-informations to be linked, the storage control device stores the received common identification-information and the received individual identification-informations so as to be associated with each other in the point storage device.

According to this invention, by linking the common identification-information with the individual identification-information, the stored contents in the respective individual storage devices can be associated with each other, so that the points can be used by the player identified by the common identification-information. When an individual file for controlling the play results for each kind of the games already exist, points effective between different games can be introduced, without changing the stored contents in these files. The individual available data stored in the data storage device may be formed by the individual identification-information and codes each designating an available unique data associated with the individual identification-information, when the unique datas are stored in another storage device.

The game machine may comprise a readout device for reading out the individual identification-information from an information storage medium storing any one of the individual identification-informations, and the first sending device sends the individual identification-information read out by the readout device to the server. The unique data may include at least one of music data, image data for displaying the background on the game screen, item data indicating items used by characters appearing in the game, and performance data specifying the performance of objects appearing in the game.

A server according to the present invention is prepared commonly for a plurality of game machines capable of playing different kinds of games from each other, and comprises a point storage device for storing identification-information for identifying a user and points so as to be corresponded with each other, the points being given in accordance with contents of user's playing in each game on each of the game machines and having a trading value unified through the games, a trading device for trading the points for any one of a plurality of unique datas, each of which is used uniquely in any one of the games, and a sending device for sending the traded unique data to the game machines.

According to this server, points to be used in various kinds of games are controlled, associated with the identification-information, the play results of the various kinds of games are converted to points, and the converted points can be reflected in the control contents. Therefore, the player can accumulates points having the trading value for data applied to other games, by playing a certain game.

The server preferably comprises a converting device for converting play-information indicating the contents of user's playing in each game on each of the game machines to the points, and a storage control device which, upon reception of the identification-information and the play-information from the game machine, allows the converted points to be reflected in the points stored in the point storage device in association with the received identification-information. According to this invention, since the play-information is converted to points in the server, the conversion rule predetermined for each of the games can be easily changed. For example, when the conversion rule for a certain game is to be changed, it is only necessary to update the stored contents in the server relating to the conversion rule.

The server further comprises a data storage device for storing user available data that identification-information and at least one of the plurality of the unique datas available to the user are associated with each other. The storage control device which, upon reception of a trading request to trade any one of the plurality of unique datas together with the identification-information, updates the points, corresponding to the received identification-information in the point storage device, to a value obtained by subtracting points corresponding to the unique data to be traded. The trading device allows the unique data to be traded to be reflected in the user available data corresponding to the received identification-information in the data storage device. According to this invention, the identification-information and the data are associated with each other according to the trading request, and the points corresponding to the data can be subtracted from the points held by the user. The user available data stored in the data storage device maybe formed by the identification-information and codes each designating available unique data associated with the identification-information, when the unique datas are stored in another storage device.

When any one of designating informations each of which designates any one of the plurality of unique datas and the identification-information are sent in association with each other from the game machine to the server, in the case where the user available data that the unique data designated by the sent designating information is associated with the sent identification-information is stored in the data storage device, the sending device may send the designated unique data to the game machine. In this case, the user can download the available unique data to the game machine.

More specifically, the data storage device may comprise a first storage device for storing the plurality of unique datas and the designating informations each of which designates each of the plurality of unique datas so as to be associated with each other, and a second storage device for storing the designating informations, each of which designates the unique data available to the user among the designating informations stored in the first storage device, and the identification-information so as to be associated with each other. Upon reception of the identification-information from the game machine, the sending device may read the designating informations stored in association with the received identification-information from the second storage device and may send the read designating informations to the game machine, and, upon reception of a designating information selected among the sent designating informations from the game machine, the sending device may read the unique data stored in association with the received designating information from the first storage device and may send the read unique data to the game machine. According to this invention, since the designating information for designating the unique data traded by the player and available now, is sent prior to downloading the unique data, the player can know about the available unique datas.

When the server receives a donation request including the identification-information of a sender, the identification-information of a receiver, and points to be donated from the sender to the receiver, the storage control device may subtract the points to be donated from the points stored in the point storage device in association with the identification-information of the sender, and may add the points to be donated to the points stored in the point storage device in association with the identification-information of the receiver. According to this invention, the server can control donation of points between players.

The server preferably comprises a notification device for notifying a user to be the receiver that donation has been done, when the storage control device updates the points stored in the point storage device according to the donation request. According to this invention, the player to be the receiver, can know about the donation of points.

The identification-information may be an individual identification-information to identify the user for each kind of the games. The data storage device may comprise an individual storage device controlled for each kind of the games. The individual storage device may store individual available data that the individual identification-information and at least one of the plurality of unique datas available to the user are associated with each other. When the server receives a common identification-information issuing request including common identification-information to link the individual identification-information corresponding to a same user and the individual identification-informations to be linked, the storage control device may store the received common identification-information and the received individual identification-informations so as to be associated with each other in the point storage device.

According to this invention, by linking the common identification-information and the individual identification-informations with each other, the stored contents in the respective individual storage devices can be associated with each other, so that points can be used by the player identified by the common identification-information. When individual files for controlling the play results for each kind of the games already exist, points effective between different games can be introduced, without changing the stored contents of these files. The individual available data stored in the data storage device may be formed by the individual identification-information and codes each designating an available unique data associated with the individual identification-information, when the unique datas are stored in another storage device.

A register terminal may be connected via a communication network with a server controlling an individual identification-information for identifying a user and data available to the user in association with each other for each kind of games, and controls common identification-information for linking the individual identification-informations corresponding to a same user and points given in accordance with contents of user's playing and having a trading value unified through the games in association with each other. The register terminal comprises a readout device for reading out the individual identification-information from an information storage medium storing any one of the individual identification-informations, an input device for inputting the common identification-information, and a sending device for sending the common identification-information input by the input device and the read out individual identification-information to the server. According to this register terminal, a plurality of individual identification-information can be associated with one common identification-information. Therefore, when various kinds of individual information is controlled for each kind of games, associated with the individual identification-information, points having a unified trading value through games can be introduced, without changing the already constructed control system. The register terminal includes the game machine.

BRIEF DESCRIPTION OF THE DRAWING

FIG. 2 is a diagram illustrating one example of stored contents in a common ID control file 51 and an individual game control file 52.

FIGS. 9A and 9B are diagrams illustrating examples of records recorded in the common ID control file 51.

DESCRIPTION OF THE PREFERRED EMBODIMENTS

One embodiment of a game system according to the present invention will be described below, with reference to the drawings.

1. Configuration of Game System

Figure 1:
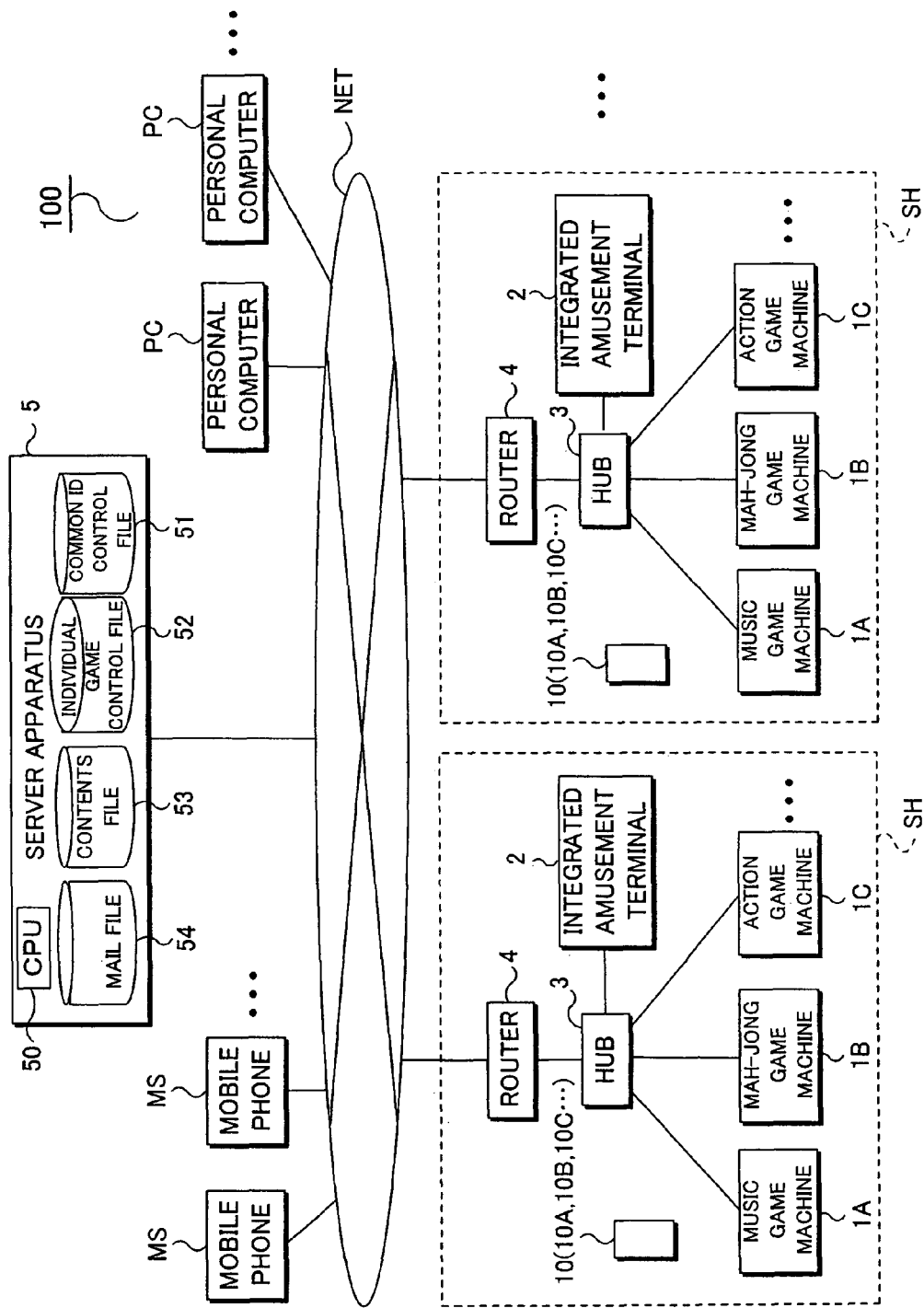
FIG. 1 is a block diagram illustrating the overall configuration of a game system 100 according to one embodiment of the present invention.

FIG. 1 is a block diagram illustrating the overall configuration of a game system 100. The game system 100 comprises respective shops SH, . . . SH, a communication network NET such as the Internet, a plurality of mobile phones MS, . . . MS, and personal computers PC, . . . PC.

In the shop SH, game machines of different kinds, such as a music game machine 1A, a mah-jong game machine 1B and an action game machine 1C are installed. These game machines 1A, 1B and 1C, and the integrated amusement terminal 2 are connected to the communication network NET via a hub 3 and a router 4, so that data communication is possible with the server 5.

The game machines 1A, 1B and 1C comprise a magnetic card reader and writer (not shown), so that information is read out from an ID card 10 or written therein. The ID card 10 is a magnetic card, and kind information specifying kind of the game and an individual ID are recorded therein. The individual ID is identification-information for identifying players for each kind of the games. The ID card 10 is used according to the kind of the game. In other words, an ID card 10A exclusive for the music game is used for the game machine 1A, an ID card 10B exclusive for the mah-jong game is used for the game machine 1B, and an ID card 10C exclusive for the action game is used for the game machine 1C. Therefore, one player may have a plurality of kinds of ID cards 10.

The ID card 10 is sold by a single-purpose card vending machine (not shown) or the integrated amusement terminal 2, which is installed in the shop SH. When a player wants to play a game, using the ID card 10, it is necessary to register the individual ID. The registration of the individual ID is performed by the integrated amusement terminal 2 or the respective game machines 1A, 1B, 1C, . . . . Specifically, the player inserts the ID card 10 into the magnetic card reader, and inputs, for example, up to eight alphanumeric characters according to the guidance displayed on the display. Then, the input alphanumeric characters are stored in the server 5 as the individual ID.

When the player plays the game by using the ID card 10, the respective game machines 1A, 1B, 1C generates result information indicating the play result, and send the generated result information to the server 5. The result information has different contents depending on the kind of the game, but may include the game score, the progress of the game, the obtained items, the number of plays, and the like. For example, the result information of the mah-jong game may include the scores and ranking at tonpoo battles, kinds and times of winning combinations, obtained items, and the number of plays. The result information for the action game may include the obtained points, the kind of the defeated rival character, and the obtained items.

The server 5 controls the game score and the like, associated with the individual ID. When the player visits the shop next time to play the same game, the server 5 sends the information indicating the past game score and the progress of the game to the respective game machines 1A, 1B, 1C, and the like. As a result, the player can restart the suspended game, or confirm the past game score and the like.

The server 5 has a CPU 50, a common ID control file 51, an individual game control file 52, a contents file 53, and a mail file 54. The CPU 50 is programmed so as to be able to access these files to read out the stored contents or update the stored contents.

One example of the stored contents of the common ID control file 51 and the individual game control file 52 is respectively shown in FIG. 2. The common ID control file 51 is for controlling various kinds of information in a table format, and the data structure thereof has a plurality of lines and rows. In each line of the common ID control file 51, a common ID, password, common points, the individual ID, and user information are stored, associated with each other. In the explanation below, a set of information written in one line in the file 51 is referred to as a record.

The common ID is identification-information for associating the individual IDs given for each kind of the games, and identifying players. The common ID is registered by a different procedure from that of the individual ID. Specifically, the player operates the integrated amusement terminal 2, to write the common ID card 10 in the common ID control file 51, together with the password and the individual ID.

The user information is information relating to the players, and includes gender, hobbies, birthday, telephone number, mail address and the like. The user information is provided to the server 5, on condition that after registering the common ID, the player accesses the homepage on the Internet, by using a mobile phone MS or a personal computer PC, to input the common ID and the password on the homepage. The administrator of the server 5 can use the user information for market research for the games, and services such as giving common points on the birthday.

The common points have a value exchangeable for data of game elements giving a change in various kinds of games, wherein the size of the value is represented numerically. In other words, the common point is different from a conventional point in that it has a unified trading value through the games. The game elements in the music game may include reproduced music pieces, and bracelets, hats and dresses of characters dancing to the music. The game elements in the mah-jong game may include wallpaper, Reach-declaring sticks, see-through glasses, and the like. The game elements in the action game may include parameters of characters relating to a combat, such as punching power, mobile speed, and jumping power, as well as the dresses of characters, technique of the characters, environment of a fighting ground, and the like. The game elements in a racing game may include parameters relating to the vehicle performance, such as performance of the brake, maximum torque, and weight, as well as a racing course, type of the car and parts such as an engine and a suspension. Moreover, the game elements in a role playing game may include items such as magic, a shield and a sword.

The common points are given to a player according to the play results, such as game score and the number of plays. The player can use the common points to purchase various kinds of game elements. Alternatively, the player can sell the purchased game elements to return these to the common points. It is important for enjoying the game that the common points have not only a value exchangeable for game elements in a certain game, but also a value exchangeable for game elements relating to other games.

For example, it is assumed that a certain player has a strong point in the mah-jong game, but a weak point in the music game or action game. In this case, the player plays the mah-jong game to obtain high common points, and use the common points to purchase music pieces in the music game or items in the action game. When the skill of the player in the music game or the action game is improved, the player can obtain high common points by playing these games, and use the obtained common points to purchase further game elements in other games. In other words, by introducing a common value which does not rely on the kind of the games as the common point, it becomes possible to reflect the play result such as the game score and the number of plays in the game contents of other kinds of games according to the intention of the player, to enjoy a plurality of kinds of games by associating these games effectively with each other.

The individual game control file 52 includes individual files 52A, 52B . . . constituted for each kind of the games. An individual file 52A is a file dedicated for the music game, and an individual file 52B is a file dedicated for the mah-jong game. The respective individual files 52A, 52B . . . store individual IDs and individual information so as to be associated with each other as user available data or individual available data.

The individual information recorded in the individual file 52A dedicated for the music game includes a music designating code, the past game score, ranking and the like. The music designating code designates music data available to the player in the music game.

The individual information recorded in the individual file 52B dedicated for the mah-jong game includes an item designating code for designating various kinds of items, the past game score, ranking and the like. The items include wallpaper used as the background on the game screen, Reach-declaring sticks for enabling declaration of Reach-Tsumo, and see-through glasses that can see through tiles of the opponents.

The data recorded in the respective individual files 52A, 52B . . . are associated with each other by the common ID. For example, an individual ID in the music game, "A123333" and an individual ID in the mah-jong game, "B655123" are associated with each other by a common ID "zcvbnmq".

The contents file 53 includes individual files 53A, 53B . . . formed for each kind of the games. The individual file 53A is a file for recording contents dedicated for the music game, and the individual file 53B is a file for recording contents dedicated for the mah-jong game. The server 5 reads out data from the contents file 53 according to need, and downloads the read-out file to the respective game machines 1A, 1B . . . .

Figure 3:
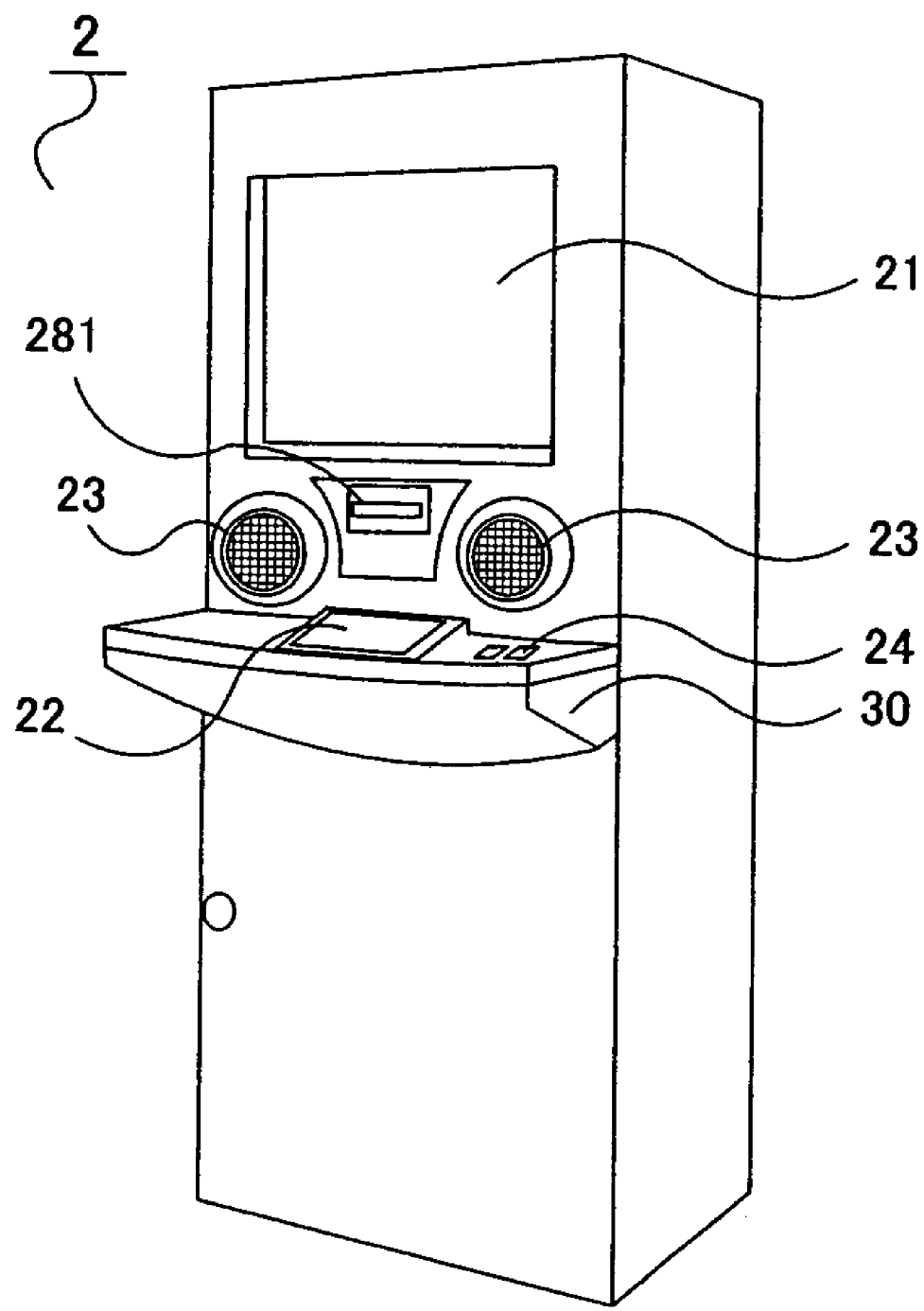
FIG. 3 is a perspective view illustrating a design of an integrated amusement terminal 2.

The integrated amusement terminal 2 has functions of registration of the common ID, purchase of items by using the common points, execution of the game, perusal of individual information and the like. FIG. 3 is a perspective view illustrating the appearance of the integrated amusement terminal 2. A main display 21 is arranged at the front of the integrated amusement terminal 2, and a sub-display 22 is arranged on the upper face of a table 30 extending to this side. The sub-display 22 has a touch panel. When a player touches the display according to the display content on the sub-display 22, an operation instruction is input by the touch panel. An input unit 24, which is used by the player for inputting an instruction, is provided on the right side of the sub-display 22. An insertion slot 281 for the ID card 10 is provided below the main display 21 at the center, and speakers 23 are provided at the right and left sides of the insertion slot 281.

Since the main display 21 has a large screen and is arranged at the front, the player as well as another person can see the screen. On the other hand, since the sub-display 22 has a small screen and is arranged on the upper face of the table 30, the player can look at the screen from above, but the other person cannot see the screen on the sub-display 22 due to the player standing in front of it. Therefore, a menu screen at the time of registering the common ID and purchasing the items, or the game screen is displayed on the main display 21, and information with high secrecy such as a common ID input by the player at the time of registering the common ID is displayed on the sub-display 22.

Figure 4:
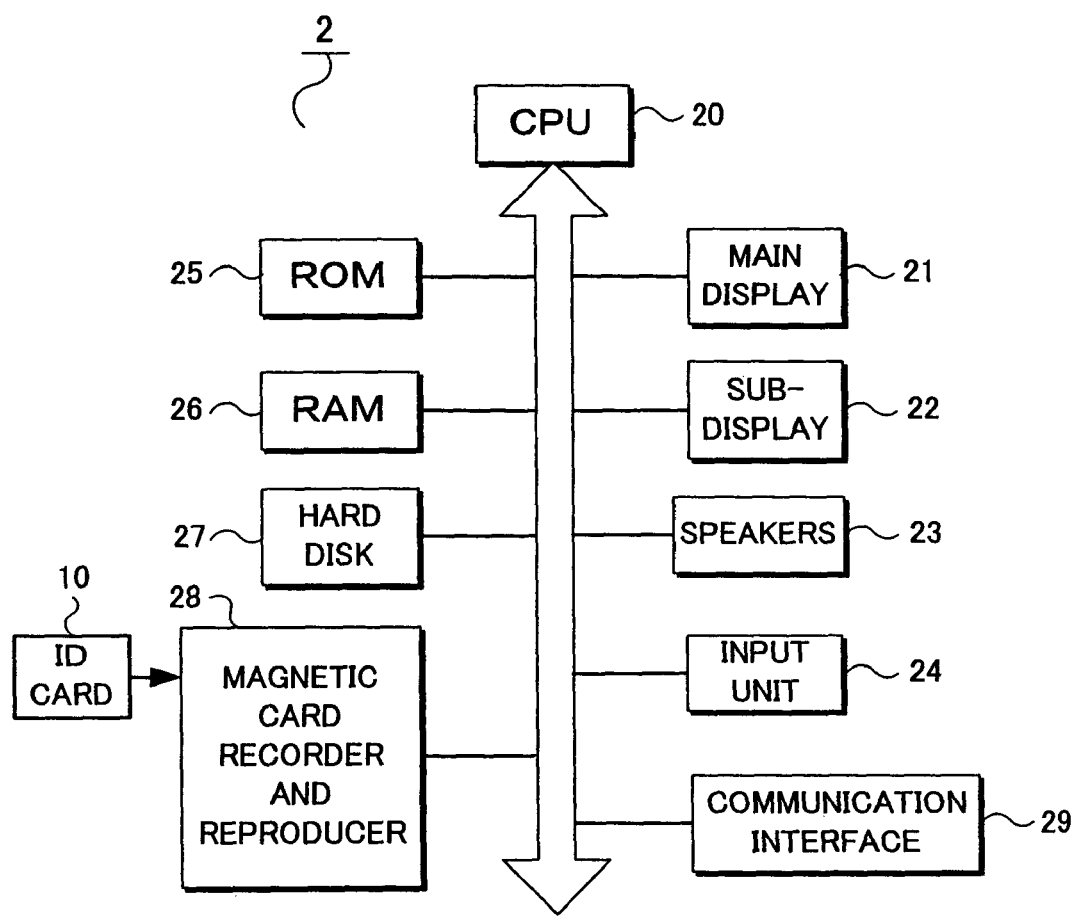
FIG. 4 is a block diagram of an electric construction of the integrated amusement terminal 2.

FIG. 4 is a block diagram illustrating the electric configuration of the integrated amusement terminal 2. The integrated amusement terminal 2 comprises the above-described main display 21, sub-display 22, speakers 23 and input unit 24, as well as a CPU 20 connected to these units via a bus. The CPU 20 serves as a control center of the integrated amusement terminal 2. A ROM 25 stores a boot program and the like, and a hard disk 27 stores game programs, a control program, a communication program, and so on.

A RAM 26 serves as a work area for the CPU 20. Specifically, the RAM 26 loads various programs stored in the hard disk 27 and stores data during execution. A magnetic card recorder and reproducer 28 writes information in the ID card 10 and reads out information from the ID card 10, based on the instruction from the CPU 20. A communication interface 29 executes data communication with the server 5.

2. Accumulation of Common Points

Accumulation of common points in the game system 100 will now be described. For this example, a player has registered a common ID and plays games using the various kinds of game machines 1A, 1B, 1C . . . .

Figure 5:
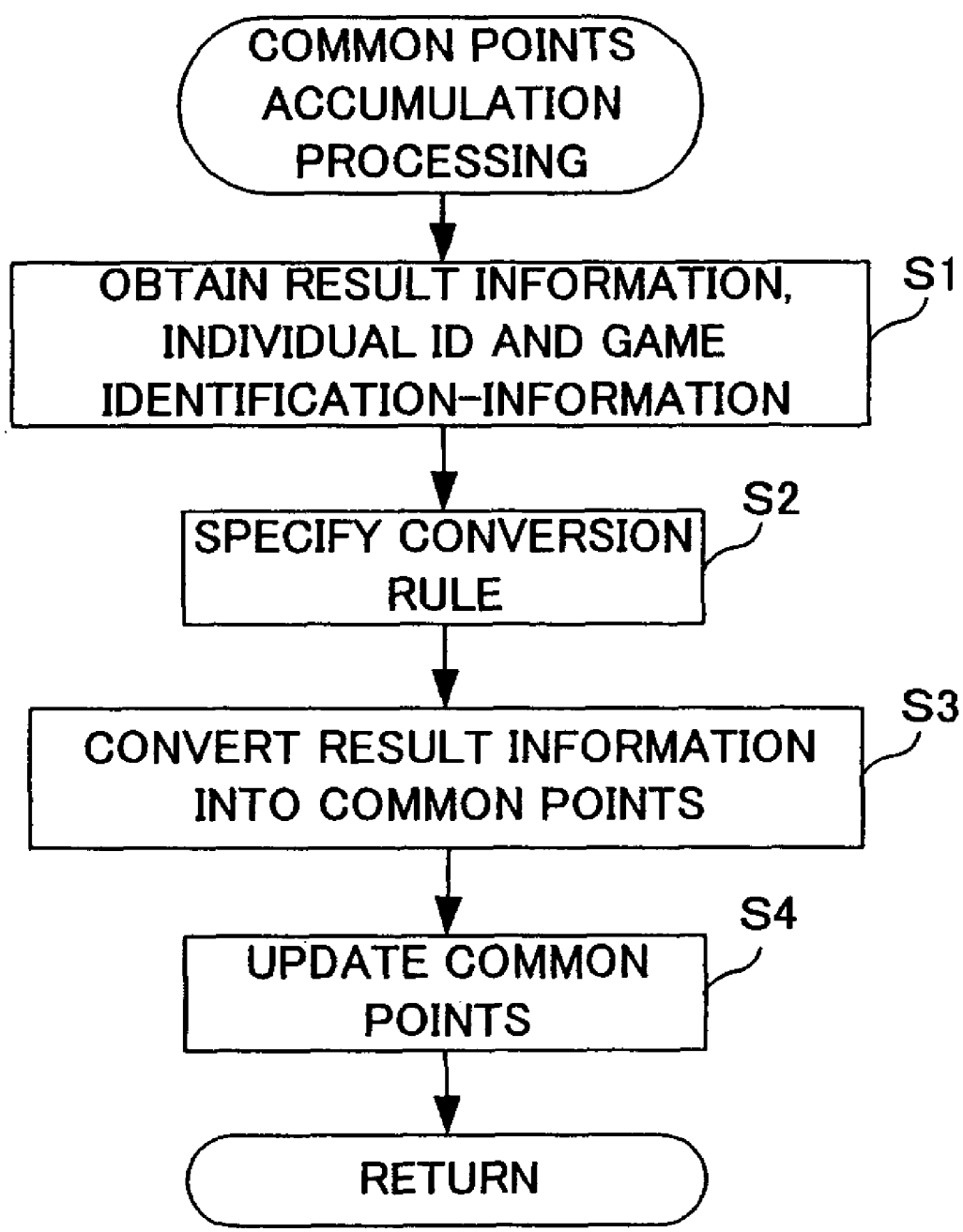
FIG. 5 is a flowchart explaining the operation of a CPU 50 in a server 5, relating to accumulation of common points.

FIG. 5 is a flowchart explaining the operation of a CPU 50 in the server 5. When the player plays the various kinds of game machines 1A, 1B, 1C . . . using the ID card 10, the respective game machines 1A, 1B, 1C . . . generates the result information indicating the play results, when the play has finished, and sends the result information, the individual ID read out from the ID card 10 and the game identification-information to the server 5.

When obtaining the result information, the individual ID and the game identification-information (step S1), the CPU 50 specifies a rule for converting the result information to the common points based on the game identification-information (step S2). The conversion rule is determined for each kind of the games. For example, the conversion rule can be determined such that in the music game, $\frac{1}{100}$ of the game score is converted to a common point, and in the mah-jong game, 100 points for one round of the tonpoo battle, and in the action game, 30 points for clearing one stage are respectively obtained. Thereafter, the CPU 50 converts the result information to the common points in accordance with the specified conversion rule (step S3).

The CPU 50 executes an update of the common points (step S4). Specifically, firstly, the CPU 50 accesses the common ID control file 51 to specify a record including an individual ID that agrees with the obtained individual ID. Secondly, the CPU 50 reads out the common points stored in the record. Thirdly, the CPU 50 adds the converted common points to the read-out common points, and writes the addition result in the record as new common points.

As described above, the common points have a value exchangeable for various kinds of game elements. Therefore, when a player plays a certain game, the player can accumulate values that can purchase the game elements in other games.

3. Operation Outline of Integrated Amusement Terminal

The operation outline of the integrated amusement terminal 2 will be described below. The integrated amusement terminal 2 provides a virtual space to players, while performing data communication with the server 5. In the virtual space, there are various kinds of virtual shops, so that players can purchase various kinds of game elements such as items, or play a game to accumulate the common points.

Figure 6:
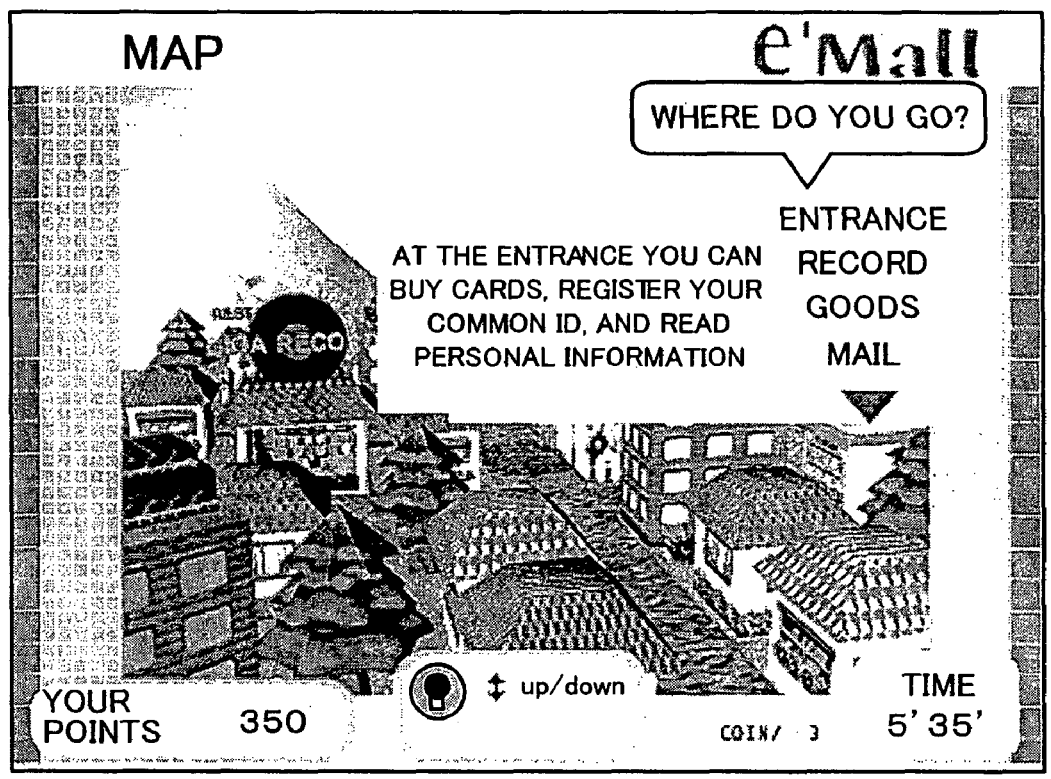
FIG. 6 is a diagram indicating an initial screen displayed on a main display 21 of the amusement terminal 2.

An initial screen displayed on the main display 21 of the amusement terminal 2 is shown in FIG. 6. As shown in this figure, on the upper right of the initial screen, a character string, "Where do you go?" is displayed. Upon selection of a downward triangle displayed below "Mail", a character "Game center" is displayed. From this initial screen, the player is urged to select a virtual shop where the player wants to go, among "Entrance", "Record", "Goods", "Mail" and "Game center".

When the player selects "Entrance", a screen for selecting any one of purchase of cards, registration of the common ID, perusal of the individual information and the like. Upon selection of "Record", a record shop is displayed. At the record shop, the player can purchase a piece of music used in the music game by using the common points, or obtain the common points by selling a piece of music to the record shop. Upon selection of "Goods", a goods shop is displayed. At the goods shop, the player can purchase items used in various kinds of the games, or sell items held by the player. Upon selection of "Mail", a post office is displayed. In the post office, the player can send a mail to a friend. At this time, the player can also donate common points or items. Moreover, upon selection of "Gamecenter", a game center is displayed. In the game center, the player can play a game, and can accumulate common points.

3-1. Registration of Common ID

The registration processing when the player selects the common ID at the entrance will now be described. This registration processing includes two types, that is, new registration processing and additional registration processing of a common ID. The new registration processing stands for processing when the player registers a common ID for the first time, wherein a set of a common ID and an individual ID is recorded in the common ID control file 51. On the other hand, the additional registration processing stands for processing for linking an individual ID with an already registered common ID, wherein another individual ID is recorded, associated with the set of the common ID and the individual ID recorded in the common ID control file 51.

In the registration processing of the common ID, a menu screen urging to select either the new registration processing or the addition registration processing is displayed on the main display of the integrated amusement terminal 2. When the player selects either one processing, the selected processing is executed.

Figure 7:
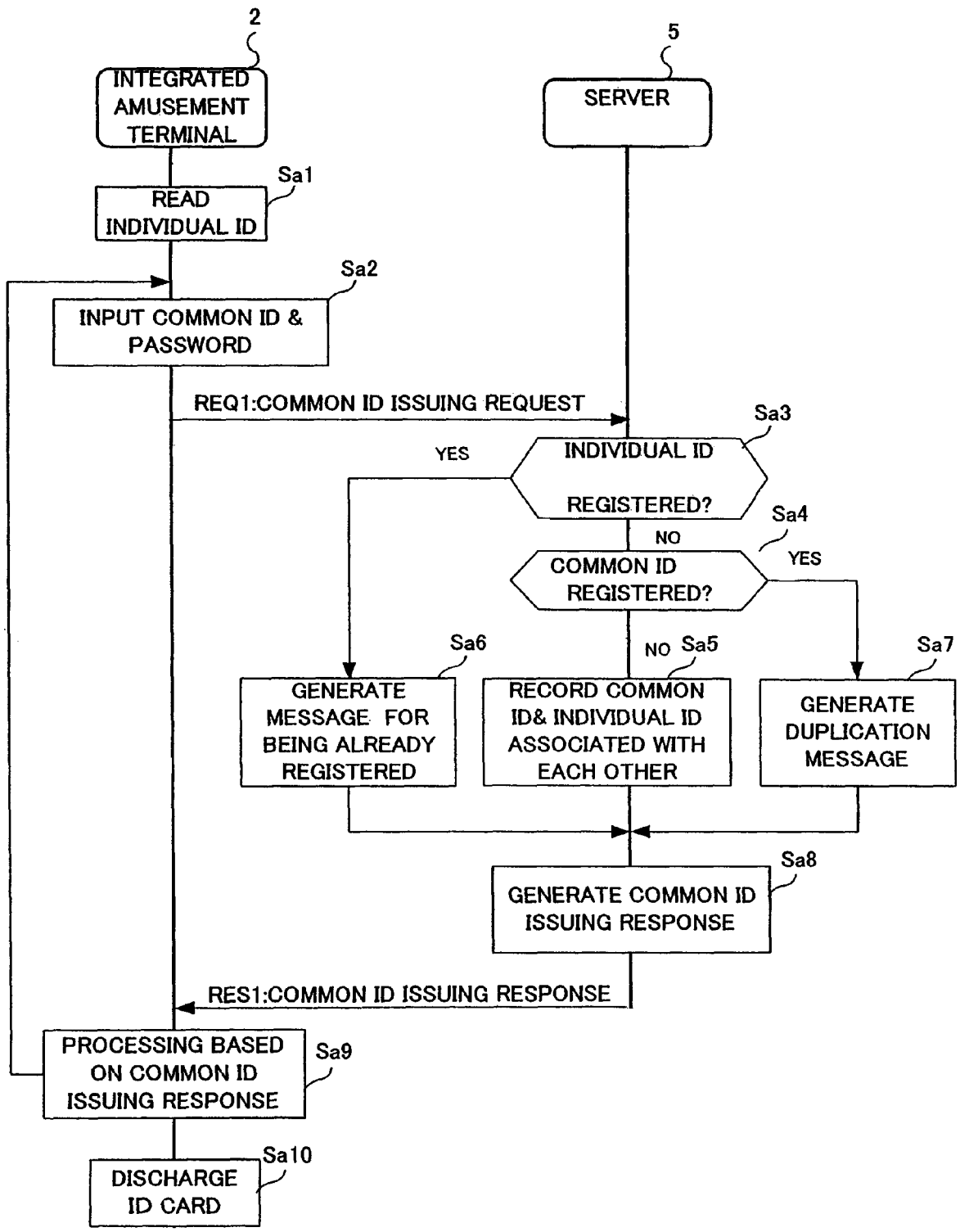
FIG. 7 is a sequence diagram indicating the operation of the integrated amusement terminal 2 and the server 5 in new registration processing of a common ID.

FIG. 7 is a sequence diagram indicating the operation of the integrated amusement terminal 2 and the server 5 in the new registration processing of a common ID. At first, the readout processing of the individual ID is conducted at the integrated amusement terminal 2 (step Sa1). In this processing, at first, the CPU 20 allows the main display 21 to display a message for urging a player to insert the ID card 10 into the machine body. Secondly, when the player inserts the ID card 10, in which the individual ID has already been registered, into the insertion slot 281, the CPU 20 obtains the individual ID and the game kind information read out by the magnetic card reader and writer 28, and stores the information in the RAM 26.

Figure 8:
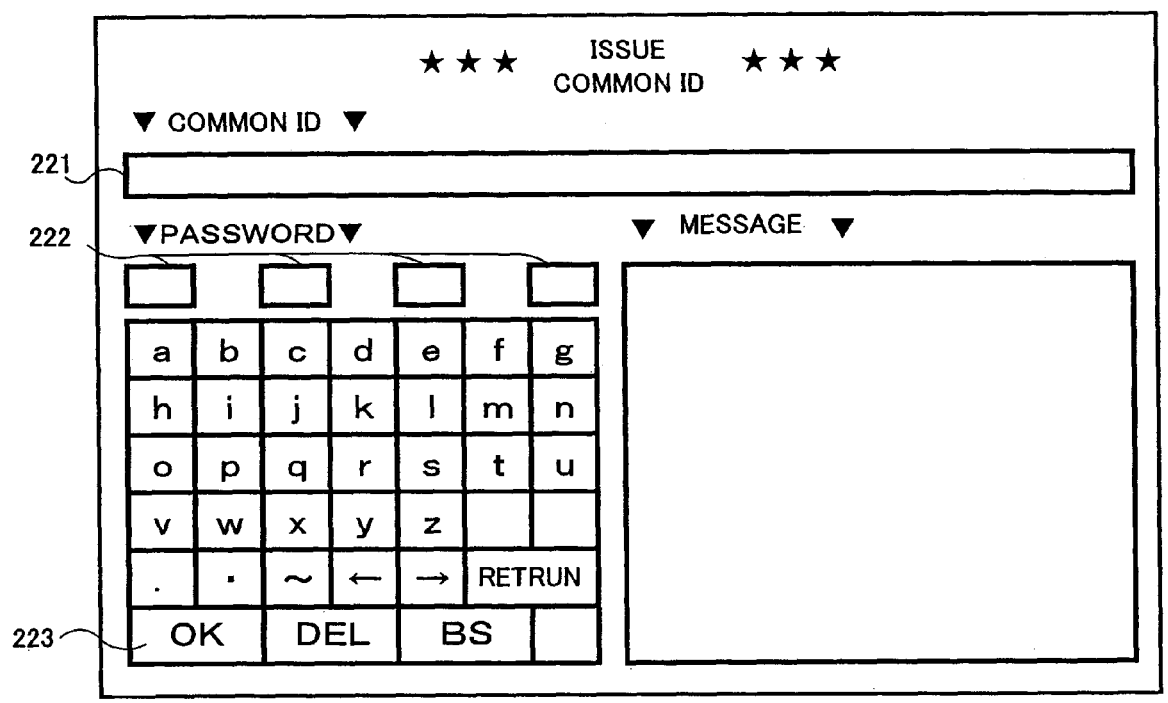
FIG. 8 is a diagram illustrating an input screen to be displayed in the input processing.

Then, the input processing of the common ID and the password is performed, using the integrated amusement terminal 2 (step Sa2). In this processing, the CPU 20 reads out the predetermined image data and allows the sub-display 22 to display the input screen shown in FIG. 8. The reason why the sub-display 22 displays the input screen is that the common ID and the password are information having high secrecy.

When the player inputs up to eight alphanumeric characters in an input column 221 and four alphanumeric characters in an input column 222 on the input screen, and touches a confirmation column 223, the CPU 20 obtains the alphanumeric characters input in the input column 221 as a provisional common ID, and the four alphanumeric characters input in the input column 222 as a provisional password. The CPU 20 then generates a common ID issuing request REQ1 as shown in FIG. 7. The common ID issuing request REQ1 includes an individual ID, game kind information, the provisional common ID and the provisional password.

Thereafter, when the CPU 20 sends the common ID issuing request REQ1 to the server 5, the server 5 executes the common ID issuing processing. First, the CPU 50 in the server 5 judges whether the individual ID separated from the common ID issuing request REQ1 has been registered in the common ID control file 51 (step Sa3).

If not yet registered, the CPU 50 proceeds to step Sa4 and judges whether the provisional common ID separated from the common ID issuing request REQ1 has been registered in the common ID control file 51 (step Sa4). If the provisional common ID has not yet been registered, the CPU 50 records the provisional common ID and the provisional password in the common ID control file 51, as correct common ID and password, associated with the individual ID, and generates a registration completion message (step Sa5).

For example, it is assumed here that an individual ID "A123456" and a common ID "tyuilkjh" recorded in the individual file 52A dedicated for the music game shown in FIG. 2 have not yet been recorded in the common ID control file 51. In this case, when the player inserts the ID card 10, in which the individual ID is recorded, in the integrated amusement terminal 2, and selects the new registration processing to input "tyuilkjh" as the provisional common ID, and "pick" as the provisional password, a record including a set of the common ID, the password and the individual ID as shown in FIG. 9A is added in the common ID control file 51. The common points "100" is the number of points uniformly provided at the time of new registration processing.

When the individual ID has already been registered in the common ID control file 51, the judgment result at step Sa3 shown in FIG. 7 becomes "YES". In this case, the individual ID has been registered in the common ID control file 51, associated with the common ID. Therefore, the CPU 50 generates a message indicating that it has already been registered (step Sa6).

When the provisional common ID has already been registered in the common ID control file 51, the judgment result at step Sa4 becomes "YES". In this case, another person uses the common ID the same as the provisional common ID. Therefore, the CPU 50 generates a duplication message (step Sa7). Thereafter, the CPU 50 generates a common ID issuing response RES1 including the messages generated at steps Sa5 to Sa7 (step Sa8), and sends the RES1 to the integrated amusement terminal 2.

Having received the common ID issuing response RES1, the integrated amusement terminal 2 executes the processing based on the common ID issuing response RES1 (step Sa9). First, when the registration completion message is included in the common ID issuing response RES1, the CPU 20 allows the main display 21 to display a message to notify the registration completion of the common ID, and discharges the ID card 10 (step Sa10). When the message indicating that it has already been registered is included in the common ID issuing response RES1, the CPU 20 allows the main display 21 to display a message to notify that the common ID has already been registered, and discharges the ID card 10 (step Sa10). When the duplication message is included in the common ID issuing response RES1, the CPU 20 allows the main display 21 to display a message urging a change of the common ID since another player uses the common ID, and returns the processing to step Sa2. In this manner, after the common ID and the individual ID have been registered in the common ID control file 51, when the player plays a game corresponding to the registered individual ID, the accumulation processing of the common ID is executed, so that the common points corresponding to the play result are accumulated.

Figure 10:
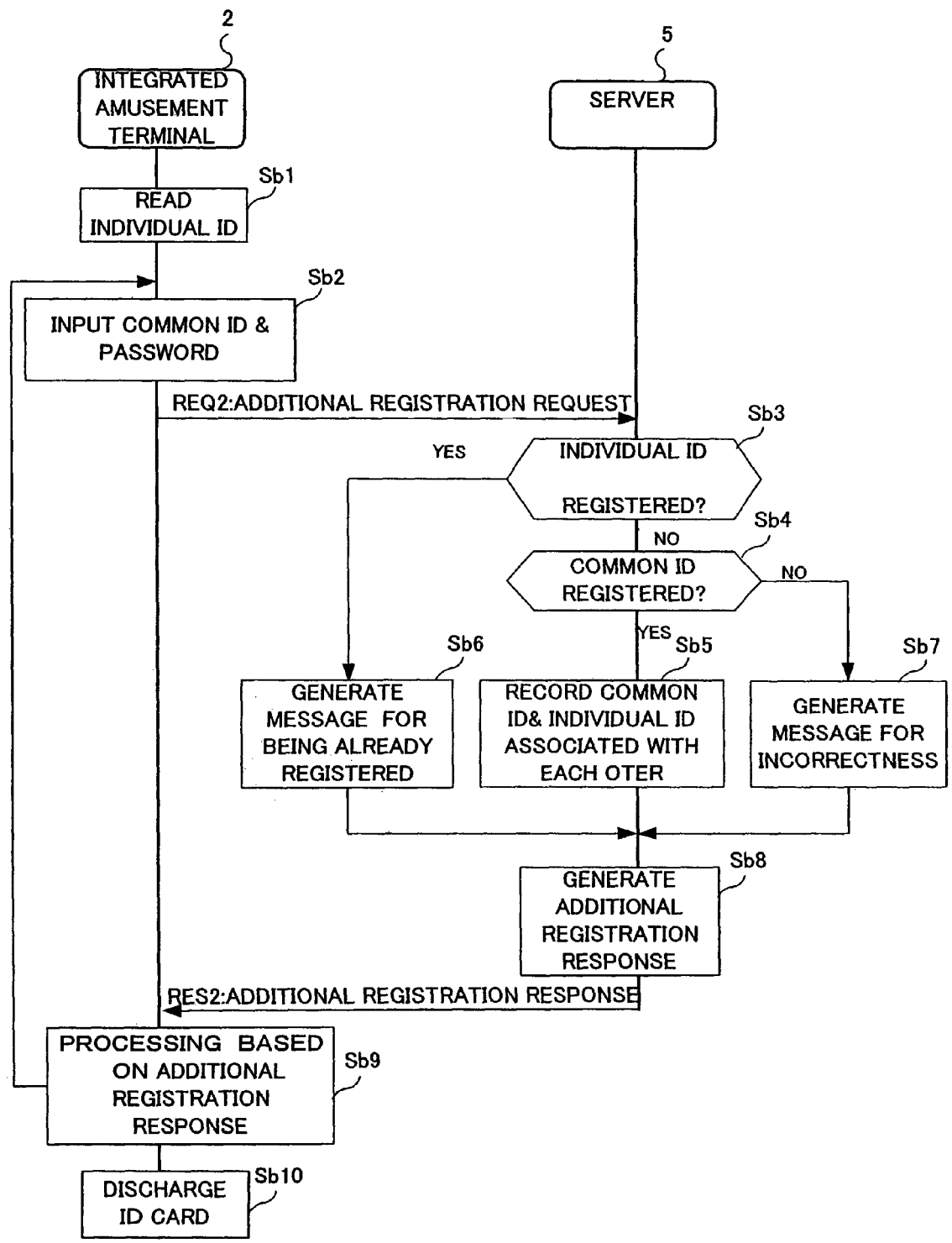
FIG. 10 is a sequence diagram indicating the operation of the integrated amusement terminal 2 and the server 5 in additional registration processing of the common ID.

The additional registration processing of the common ID will be described next. FIG. 10 is a sequence diagram indicating the operation of the integrated amusement terminal 2 and the server 5 in the additional registration processing of the common ID. The processing at steps Sb1, Sb2, Sb3 and Sb6 shown in FIG. 10 are the same as the processing at steps Sa1, Sa2, Sa3 and Sa6 in the new registration processing of the common ID described with reference to FIG. 7, and hence the description thereof is omitted.

The additional registration request REQ2 shown in FIG. 10 includes an individual ID, game kind information, a common ID and a password. At step Sb4, the CPU 50 in the server 5 judges whether the common ID and the password separated from the additional registration request REQ2 have been already registered in the common ID control file 51. If the common ID and the password have been already registered, the CPU 50 records the individual ID separated from the additional registration request REQ2 in the common ID control file 51, associated with the already registered common ID and the password, and generates a registration completion message (step Sb5).

For example, a player additionally registers an ID card 10B dedicated for the mah-jong game, in which "B775544" is recorded as the individual ID, associated with the common ID "tyuilkjh". Here, it is also assumed that a set of the common ID, the password and the individual ID shown in FIG. 9A has been already recorded in the common ID control file 51 by the new registration processing. In this case, when the player inputs the common ID "tyuilkjh" and the password "piok" at step Sb2, the CPU 50 in the server 5 updates the record in the common ID control file 51 shown in FIG. 9A to a record shown in FIG. 9B, in the processing at step Sb5. That is, the CPU 50 records "B775544" in the mah-jong column of the individual ID.

When the common ID and the password have not yet been registered in the common ID control file 51, the judgment result at step Sb4 becomes "NO". In this case, the CPU 50 generates an incorrectness message (step Sb7). Thereafter, the CPU 50 generates an additional registration response RES2 including the messages generated at steps Sb5 to Sb7 (step Sb8), and sends the RES2 to the integrated amusement terminal 2.

Having received the additional registration response RES2, the integrated amusement terminal 2 executes the processing based on the additional registration response RES2 (step Sb9). First, when the registration completion message is included in the additional registration response RES2, the CPU 20 allows the main display 21 to display a message to notify the registration completion of the individual ID, and discharges the ID card 10 (step Sb10). When the message indicating that it has already been registered is included in the additional registration response RES2, the CPU 20 allows the main display 21 to display a massage that the individual ID has already been registered associated with the common ID, and discharges the ID card 10 (step Sb10). When the incorrectness message is included in the additional registration response RES2, the CPU 20 allows the main display 21 to display a message urging the player to input a correct common ID and password, and returns the processing to step Sb2.

In this manner, the individual ID is additionally registered, and when the player plays a plurality of kinds of games, the player can accumulate the common points. Moreover, by the processing for linking a plurality of individual IDs with the common ID, the common points can be introduced without adding a big change in an already constructed game system. In other words, when there are individual game control files 52A, 52B and the like for each kind of the games, and an independent game system has been constructed for each kind of the games, if a player registers an individual ID in the common ID control file 51, a shift to the common point system can be realized for a unit of user, without adding a change in these files.

3-2. Use of Common Points

Use of the common points will now be described. As described above, the integrated amusement terminal 2 provides a virtual space including virtual shops to players. When the common points are used, the players can purchase music pieces or items provided in the record shop or goods shop. One example in which a player selects Record on the menu screen shown in FIG. 6 to purchase music pieces in the record shop will be described.

Figure 11:
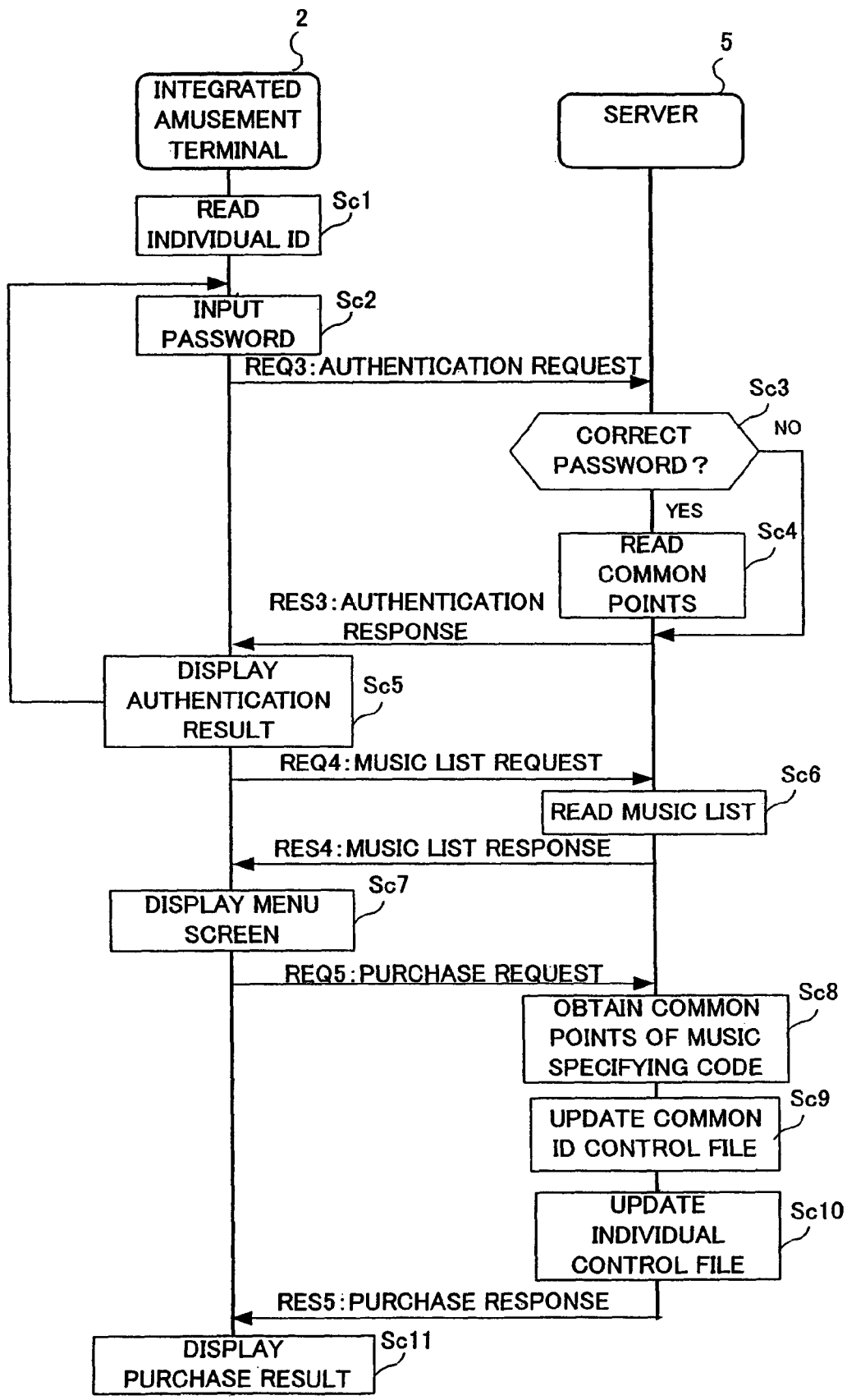
FIG. 11 is a sequence diagram indicating the operation of the integrated amusement terminal 2 and the server 5, when a player purchases music pieces in a record shop.

FIG. 11 is a sequence diagram indicating the operation of the integrated amusement terminal 2 and the server 5, when the player purchases music pieces in the record shop. In this example, it is assumed that the player holds an ID card 10A on which an individual ID "A123333" is recorded, and an ID card 10B on which an individual ID "B655123" is recorded, and a common ID "zxcvbnmp" which links the individual ID "A123333", with the individual ID "B655123" is recorded in the common ID control file 51, as shown in FIG. 2.

First, the readout processing of the individual ID is conducted at the integrated amusement terminal 2 (step Sc1). In this processing, the CPU 20 allows the main display 21 to display a message for urging the player to insert the ID card 10. In this example, it is assumed that the player has inserted the ID card 10B dedicated for the mah-jong game into the insertion slot 281. Then, the CPU 20 obtains the individual ID "B655123" and the game kind information.

Then, the input processing of the password is conducted at the integrated amusement terminal 2 (step Sc2). In this processing, the CPU 20 reads out the predetermined image data and allows the sub-display 22 to display the input screen, to urge the player to input the password. In this example, it is assumed that the player inputs the correct password "koma".

Thereafter, the CPU 20 generates an authentication request REQ3. The authentication request REQ3 includes an individual ID, the game kind information and the password. When the CPU 20 sends the authentication request REQ3 to the server 5, the server 5 judges whether the password is correct (step Sc3).

Specifically, the CPU 50 in the server 5 accesses the common ID control file 51, to specify a record including the individual ID separated from the authentication request REQ3, and reads the password included in the record. In this example, a record including the common ID "zxcvbnmp" shown in FIG. 2 is specified as the record including the individual ID "B655123", and the password "koma" in this record is read out. Thereafter, the CPU 50 judges whether the read-out password agrees with the password separated from the authentication request REQ3, thereby to determine whether the password is correct.

When the password is correct, the CPU 50 reads out the common points included in the record (step Sc4). In this example, since the password is correct, the common points "350" is read out.

The CPU 50 in the server 5 generates and sends the authentication response RES3 to the integrated amusement terminal 2. When the password is correct, the authentication response RES3 includes the common points, and on the other hand, when the password is not correct, the authentication response RES3 does not include the common points. The authentication response RES3 in this example includes the common points "350".

When the integrated amusement terminal 2 has received the authentication response RES3, the CPU 20 in the integrated amusement terminal 2 allows the main display 21 to display the authentication result (step Sc5). At this time, if the password is not correct, the CPU 20 allows the main display 21 to display a character string "Password is wrong. Please input the password again.", and returns the processing to step Sc2.

Figure 12:
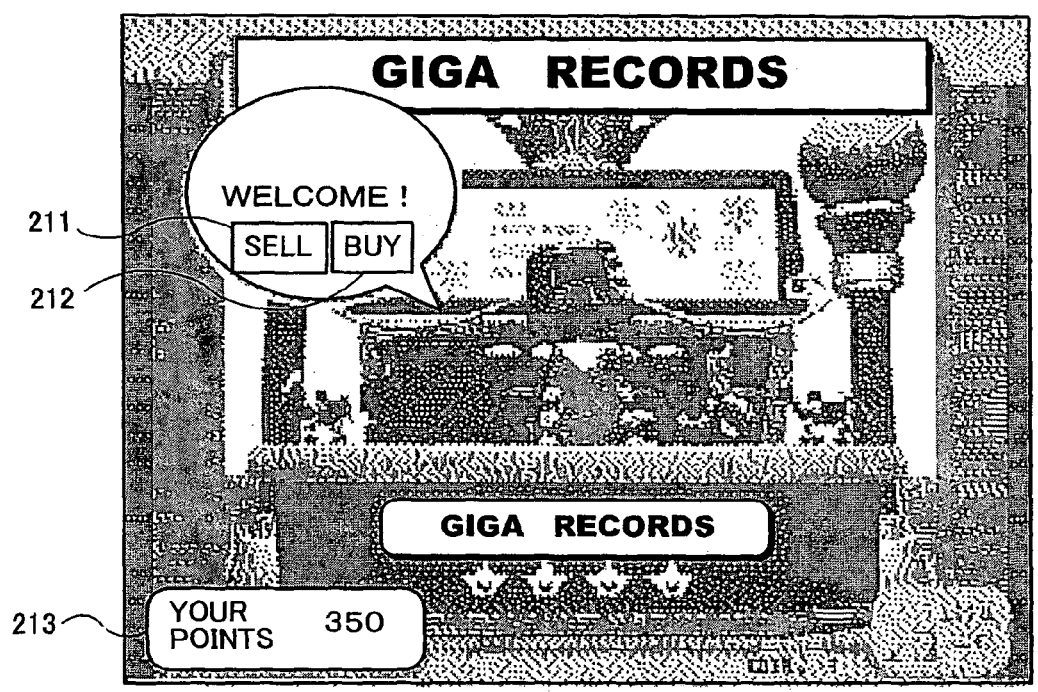
FIG. 12 is a diagram illustrating one example of the initial screen in the record shop.

On the other hand, when the password is correct, the CPU 20 allows the main display 21 to display the initial screen shown in FIG. 12. On the upper left of the initial screen, there are arranged a selection button 211 displayed as "Sell", and a selection button 212 displayed as "Buy". On the bottom left, a display column 213 indicating the common points held by the player is arranged.

When the player clicks the selection button 212, the CPU 20 sends a music list request REQ4 to the server 5. When the server 5 receives the music list request REQ4, the CPU accesses the contents file 53, to generate a music list indicating music pieces available to be distributed. The music list includes a music designating code for designating music data recorded in the contents file 53, and music information indicating the genre of the music, name of the music, artist, performance time and common points.

Figure 13:
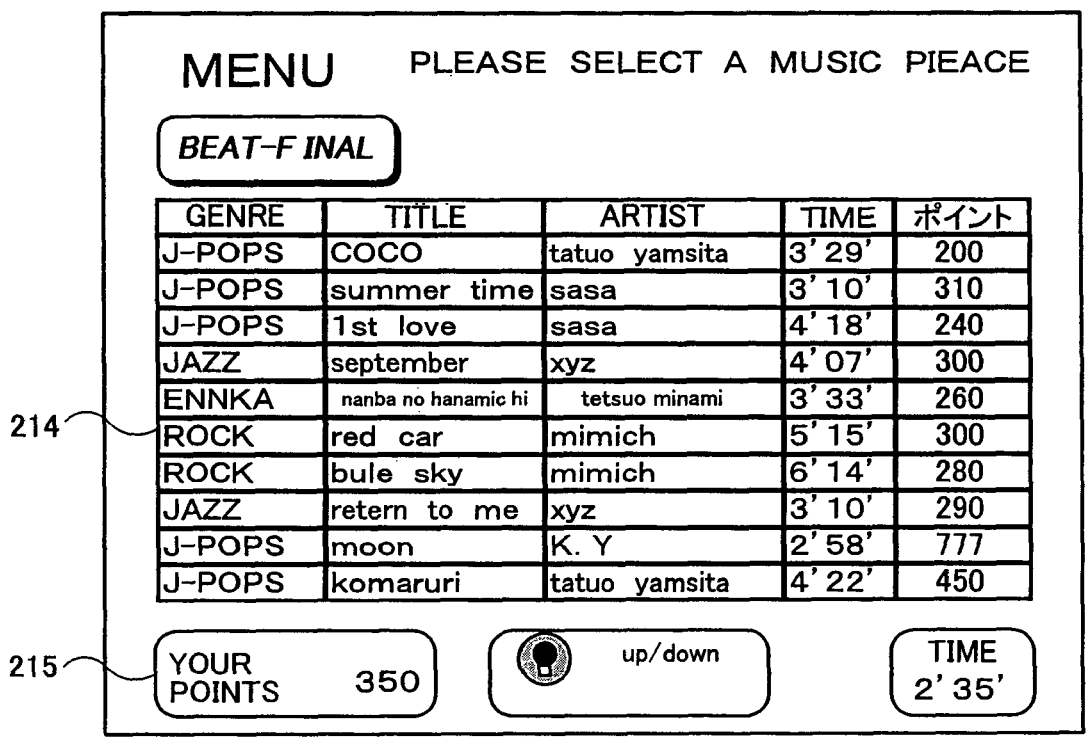
FIG. 13 is a diagram illustrating one example of a menu screen at the time of purchasing of music pieces.

When the integrated amusement terminal 2 receives the music list response RES4, the CPU 20 generates image data for displaying the menu screen, based on the music list response RES4, and allows the main display 21 to display the menu screen. One example of the menu screen is shown in FIG. 13. As shown in this figure, a table linking the genre of the music, name of the music, artist, performance time and common points is displayed in the central column 214 on the menu screen, and the common points are displayed in a display column 215 on the bottom left. By this menu screen, the player can purchase favorite music pieces within the range of the player's common points.

When the player selects favorite music from the menu screen, the CPU generates a purchase request REQ5 including the music designating code for designating the selected music piece, and sends the REQ5 to the server 5. On the menu screen shown in FIG. 13, if it is assumed that the music designating code for the name of music "COCO" displayed on the uppermost line in the central column 241 is "P123", and the player selects the name of music "COCO", the music designating code "P123" is sent to the server 5.

Figure 14:
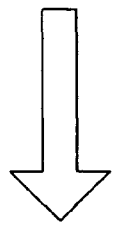
FIG. 14 is a diagram illustrating an update example of a common ID control file 51.

Thereafter, the CPU 50 in the server 5 obtains the common points corresponding to the music designating code separated from the purchase request REQ5 from the contents file 53 (step Sc8), to update the common points in the common ID control file 51 (step Sc9). In the above-described example, the common points for the name of music "COCO" is "200". Therefore, as shown in FIG. 14, the contents of the record including the common ID "zxcvbnmp" in the common ID control file 51 are updated, and the common points changes from "350" to "150".

Figure 15:
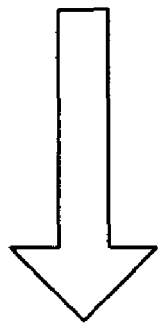
FIG. 15 is a diagram illustrating an update example of an individual game control file 52A.

The CPU 50 adds the music designating code for the music purchased by the player in the individual game control file 52A dedicated for the music game, and updates the stored contents. In the above-described example, as shown in FIG. 15, the contents of the record including the individual ID "A1233331" in the individual game control file 52A are updated, and the music designating code "P123" is added in the personal information column.

Thereafter, the CPU 50 generates a purchase response RES5, and sends the RES5 to the integrated amusement terminal 2. Then, the integrated amusement terminal 2 allows the main display 21 to display the purchase result.

In this example, the player can purchase the music data to be used in the music game, by using the ID card 10B dedicated for the mah-jong game. The reason is that the individual ID for the mah-jong game and the individual ID for the music game are linked to each other, using the common ID as a key in the common ID control file 51. In other words, by the registration of the common ID, a plurality of ID cards 10A, 10B held by a user are associated with each other, so that the available range of the cards can be expanded.

One example of purchasing music pieces to be used in the music game has been described above, with regard to the usage of the common points. The same processing applies to the mah-jong game and the action game. For example, when the player purchases an item in the mah-jong game, on the initial screen shown in FIG. 6, the player selects goods. Then, a menu screen relating to the goods shop of the virtual shops is displayed on the main display 21. On this menu screen, a genre of games, such as music game, mah-jong game and action game can be selected. If the player selects the mah-jong game, a screen on which each of the items in the mah-jong game corresponds to the common points is displayed.

When the player selects an item, a purchase request is sent from the integrated amusement terminal 2 to the server 5, the common points corresponding to the item designated by the purchase request are subtracted from the common points recorded in the common ID control file 51, and the purchased item is written in the individual game control file 52B.

3-3. Use of Mail

The post office of the virtual shops provides a mail function between players having the common IDs. The mail function includes a function of transferring messages, a function of transferring messages attached with common points, and a function of transferring the common points.

At the time of sending a message, in the post office, when the player inputs the receiver's common ID and a message, the input common ID and message are sent to the server 5, and the common ID and message are recorded, associated with each other, in the mail file 54 in the server 5. On the other hand, at the time of receiving a message, when the player inserts the ID card 10 in the game machine 1A, 1B, 1C . . . or in the integrated amusement terminal 2 to execute some authentication processing, and when the player is authenticated as a proper player, the CPU in the server 5 accesses the mail file 54, so that a message corresponding to the common ID is displayed on the display of the game machine 1A, 1B, 1C . . . or on the main display 21 in the integrated amusement terminal 2. Moreover, it is also possible to send a message with the common points. In this case, the stored contents in the common ID control file 51 are updated, such that the sent common points are subtracted from the common points of the sender player, and the sent common points are added to the common points of the receiver player.

Figure 16:
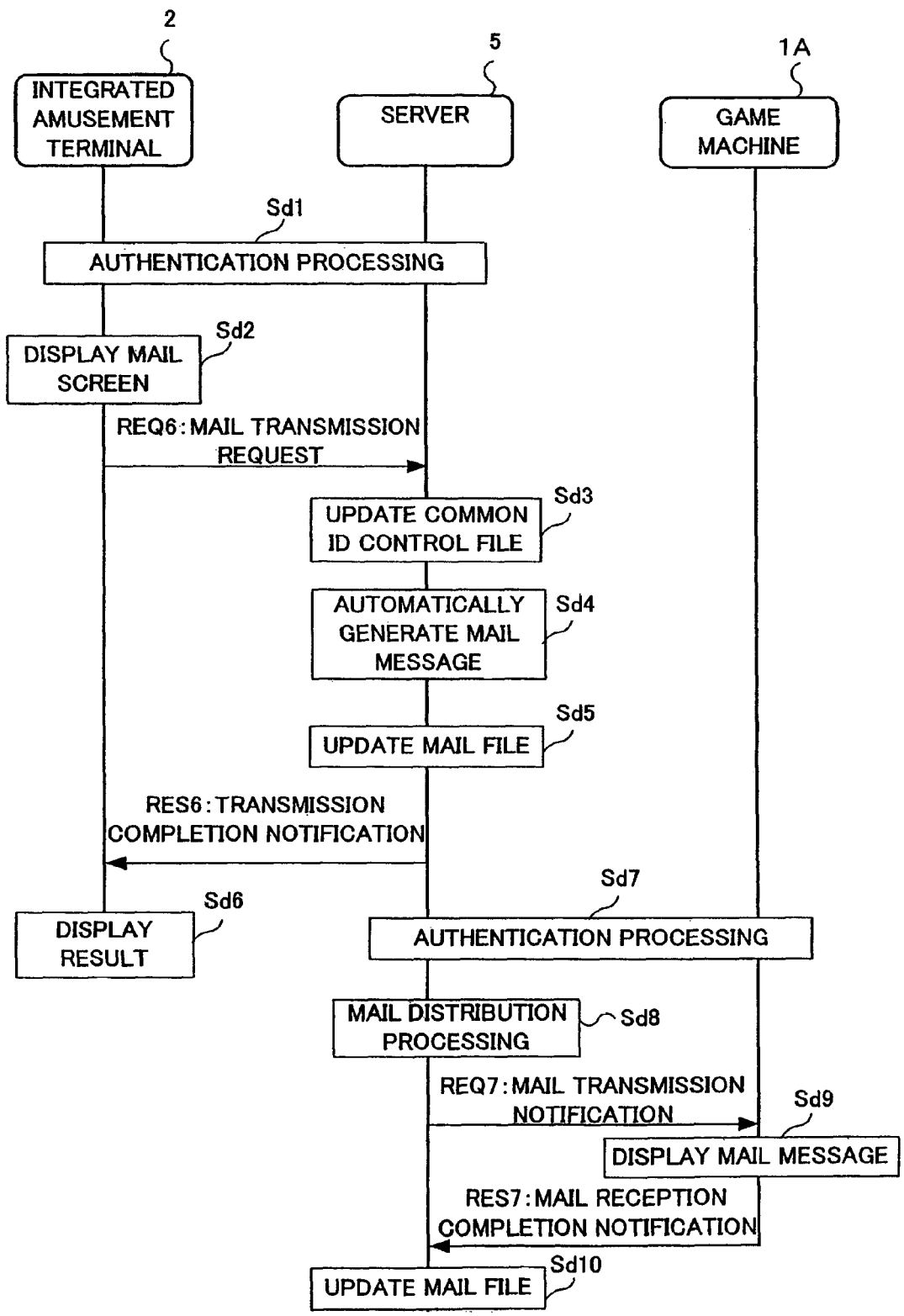
FIG. 16 is a sequence diagram indicating the operation of the integrated amusement terminal 2, the server 5 and a game machine 1A, when a player transfers the common points.

The processing for transferring the common points will now be described. FIG. 16 is a sequence diagram indicating the operation of the integrated amusement terminal 2, the server 5 and the game machine 1A, when a player transfers the common points. First, the authentication processing is conducted between the integrated amusement terminal 2 and the server 5 (step Sd1). This authentication processing is the same as the processing from readout of the individual ID (step Sd1) shown in FIG. 11 until the integrated amusement terminal 2 receives the authentication response RES3. In other words, when it is authenticated by the server 5 that the player is a proper player by using the password, the common points of the player is read out from the common ID control file 51, and the authentication response RES3 including the common points is sent to the integrated amusement terminal 2.

Figure 17:
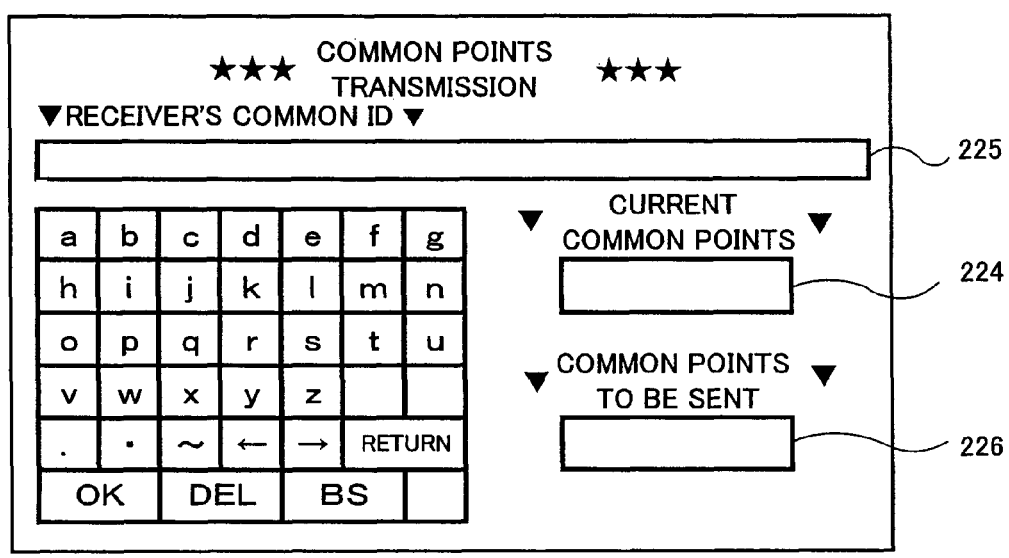
FIG. 17 is a diagram illustrating one example of a mail screen at the time of transmission of the common points.

When the player is authenticated to be a proper player, the mail screen shown in FIG. 17 is displayed on the sub-display 22. On this mail screen, a display column 224, a receiver input column 225 and a point input column 226 are arranged. In the display column 224, the common points obtained by the CPU 20 in the authentication processing are displayed. As a result, the player can know of the common points held by himself/herself. The receiver input column 225 is a block for inputting the receiver's common ID, and the point input column 226 is a block for inputting the common points to be sent.

When the player inputs the common ID and the common points to be given to a person to be the receiver in the receiver input column 225 and the point input column 226 respectively, the CPU 20 sends a mail transmission request REQ6 to the server 5. The mail transmission request REQ6 includes the common ID of the receiver and the common points to be donated.

The CPU 50 in the server 5 updates the stored contents in the common ID control file 51, based on the mail transmission request REQ6 and the sender's common ID (step Sd3). For this example, the common points associated with the sender's common ID and stored is designated as P1, the common points associated with the receiver's common ID and stored is designated as P2, and the common points to be donated from the sender to the receiver is designated as P3. Then, in the update processing, the sender's common points are changed from P1 to P1−P3, and the receiver's common points are changed from P2 to P2+P3.

Thereafter, the CPU 50 executes mail message automatic generation processing (step Sd4). In this processing, a mail message informing the receiver player that the common points have been sent from the sender player is automatically generated. This mail message is generated by filling the sender's common ID, the common points, and the date in a fixed form. For example, "Common points ΔΔ is presented from OO on XX" is prepared as the fixed form, and the mail message is prepared by filling the sender's common ID in OO, the common points to be donated in ΔΔ, and the transferred date in XX.

The thus generated mail message is stored in the mail file 54, corresponding to the sender's common ID (step Sd5). Thereafter, when the server 5 sends a transmission completion notification RES6 to the integrated amusement terminal 2, a character string "Transmission has been completed" is displayed on the main display 21 (step Sd6) of the integrated amusement terminal 2. As a result, the sender player can confirm that the common points have been transferred to the destination.

Reception of the mail will be described below. The mail is distributed when the player as the receiver accesses the server 5, by using the game machine 1A, 1B, 1C . . . or the integrated amusement terminal 2. Here, a case in which the player as the receiver plays the music game by using the music game machine 1A will be explained as one example.

When the receiver player inserts the ID card 10A in the music game machine 1A, the authentication processing is performed between the music game machine 1a and the server 5 (step Sd7). In the authentication processing, when the player is authenticated to be a proper player, the server 5 performs mail distribution processing by using the individual ID dedicated for the music game from the music game machine 1A, in the authentication processing (stepSd8). In this processing, first, the CPU 50 in the server 5 accesses the common ID control file 51, to obtain the common ID corresponding to the individual ID. Secondly, the CPU 50 accesses the mail file 54, to judge whether a mail corresponding to the obtained common ID is stored. Thirdly, if a mail is stored, the CPU 50 reads out the mail and generates a mail transmission notification REQ7. The mail transmission notification REQ7 includes the read-out mail.

Thereafter, when the music game machine 1A receives the mail transmission notification REQ7, the music game machine 1A displays the mail on the display (step Sd9), and sends a mail reception completion notification RES7 to the server 5. After having received the mail reception completion notification RES7, the server 5 deletes the mail from the mail file 54, to update the stored contents in the mail file 54 (step Sd10).

4. Distribution of Contents

Figure 18:
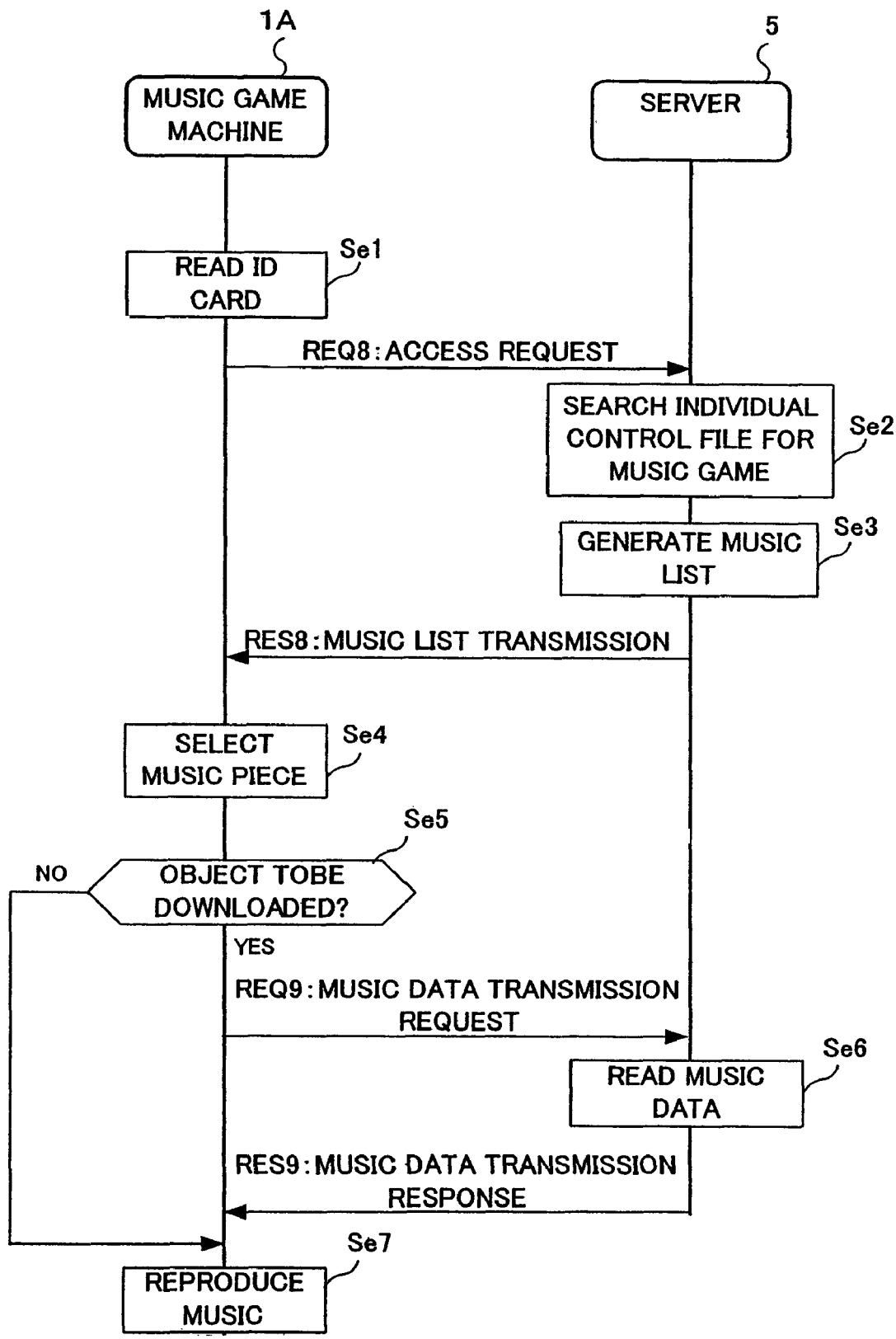
FIG. 18 is a sequence diagram indicating the operation of the game machine 1A and the server 5, when music data is distributed to a music game machine.

The operation for distributing music pieces or items purchased by using the common points from the server 5 to the respective game machines 1A, 1B, 1C . . . will be described, by taking an example of the music game. FIG. 18 is a sequence diagram indicating the operation of the game machine 1A and the server 5, when music data is distributed to the music game machine. First, when a player inserts the ID card 10A in the music game machine 1A, the music game machine 1A reads out the individual ID and the game kind information stored on the ID card 10A (step Se1), and sends an access request REQ8 to the server 5. The access request REQ8 includes an individual ID and the game kind information. The game kind information in this example indicates the music game.

The CPU 50 in the server 5 specifies an object to be accessed, based on the game kind information included in the access request REQ8. Since the game kind information in this example indicates the music game, the individual game control file 52A for the music game is specified. The CPU 50 then searches the individual game control file 52A dedicated for the music game (step Se2). In this search processing, the CPU 50 reads out a music designating code associated with the individual ID separated from the access request REQ8. For example, if the individual game control file 52A is as shown in FIG. 2, and the individual ID is "A1547891", the music designating codes P005, P006 and P011 are read out.

Thereafter, the CPU 50 generates a music list (step Se3). The music list includes the read-out music designating code and the music information corresponding thereto. The music information indicates the music content, and includes the genre of the music, name of the music, artist, and performance time, and is stored in the contents file 53, associated with the music designating code and the music data. In the music list generation processing, the CPU 50 accesses the contents file 53, and reads out the music information corresponding to the music designating code readout at step Se2, to generate a music list. The generated music list is sent to the music game machine 1A (RES8).

When the music game machine 1A receives the music list, a music selection screen, in which the received music list is reflected, is displayed on the display on the music game machine 1A. When the player selects the music (step Se4), the CPU in the music game machine 1A judges whether the selected music is an object to be downloaded (step Se5). Specifically, when the music is selected from the received music list, it is judged to be the object to be downloaded.

When it is judged to be the object to be downloaded, the music game machine 1A sends a music data transmission request REQ9 to the server 5. The music data transmission request REQ9 includes the music designating code designating the music selected by the player.

When the server 5 receives the music data transmission request REQ9, the CPU 50 accesses the contents file 53, to read out the music data stored, associated with the music designating code separated from the music data transmission request REQ9 (step Se9). The server 5 then sends a music data transmission response RES9 including the read-out music data to the music game machine 1A.

When the judgment result at step Se5 is "YES", the music game machine 1A reproduces the music data obtained from the server 5. On the other hand, when the judgment result at step Se5 is "NO", the music game machine 1A reproduces music data stored in advance (step Se7). In this manner, the player can instruct the game machine 1A to download the music data purchased by using the common points, and play the music game.

Since the music used in the music game is likely to be affected by the trend, it is desired to provide new songs at all times. On the other hand, the music stored in the music game machine 1A is limited to the music data stored in a hard disk or a ROM of the music game machine 1A, when the music game machine 1A is shipped from a factory. In this embodiment, however, since the player can use the common points to purchase the music data, a new song can be provided at any time, if the new song in the trend is stored in the contents file 53 on the server 5.

In this example, the music list is sent, prior to downloading the music data, and after the player selects the music, download of the large-capacity music data is executed. That is, after selection of the music is fixed, the large-capacity data communication is executed. As a result, the communication resource can be effectively utilized.

Here, the music data has been described as one example of contents distribution, but in the case of the mah-jong game, for example, image data of wallpaper displaying the screen background may be downloaded in the same manner, and in the case of the action game, data instructing a parameter indicating the combat efficiency of a character may be downloaded.

5. Modified Example

One Embodiment of the present invention has been described above, but the present invention is not limited to the above-described embodiment, and for example, modification as described below is possible.

(1) In the above-described embodiment, the game element purchased by the player, using the common points are game data such as music data. However, the game data may be an instruction which makes it possible for a player to use a game element hidden at the time of normal play, in the game machines 1A, 1B, 1C . . . For example, in the music game machine 1A, the construction may be such that a memory which stores in advance music data MD1 to MD20 corresponding to music 1 to music 20 is provided, music 1 to music 10 can be designated at the time of normal play, and music 11 to music 20 can be purchased in the record shop of the virtual shops. In this case, if it is assumed that the player has purchased music 15, when the player plays the music game at the music game machine 1A, an instruction for making the music 15 available is sent from the server 5. Then, the music game machine 1A displays a screen for selecting the music 1 to 10 and the music 15, and when the player selects the music 15, the music data MD15 may be read out from the memory and reproduced.

(2) In the above-described embodiment, the integrated amusement terminal 2 has the perusal function, but the common points and the personal information may be read, on condition that the player accesses the server 5, using a mobile phone MS or a personal computer PC, to input a common ID, an individual ID, and a password. With regard to mail transmission, a mail may be transmitted to a mail address stored in the common ID control file 51. Alternatively, when the mail address has been registered, the registered mail address is given priority, and when the mail address has not been registered, the mail may be distributed from the server 5 at the moment when the player to be the receiver plays a game at the game machine 1A, 1B, 1C . . . The integrated amusement terminal 2 is installed in a shop SH such as a game center, but may be installed in a convenience store or in the premises of a station.

(3) In the above-described embodiment, the integrated amusement terminal 2 is used to execute the new registration processing and additional registration processing of the common ID, but these processing may be executed by using a personal computer PC having a magnetic card reader. Moreover, purchase of the game element may be performed with the personal computer PC.

(4) In the above-described embodiment, the result information is sent from the game machines 1A, 1B . . . to the server 5, and the server 5 converts the result information to the common points, in accordance with the conversion rule. That is, the server 5 has the conversion function. However, the present invention is not limited thereto, and the respective game machines 1A, 1B . . . may have the conversion function. In this case, the respective game machines 1A, 1B . . . converts the result information to the common points, and the common points and the individual ID read out from the ID card 10 are sent to the server 5. As a result, the processing load relating to the conversion function of the server 5 can be reduced.

What is claimed is:
1. A game system comprising:
a plurality of game machines; and
a server in communication with said game machines, each of said game machines configured for playing different kinds of games from each other, one of each of said game machines or said server comprises a converting device for converting play-information indicating the contents of a user's playing in each game on each of said game machines into points in accordance with the contents of the play-information, the points having a trading value unified throughout the games and are tradeable for game elements to be used uniquely in one of the games, each of said game machines comprising a first sending device for sending sending-information including identification-information to identify a user and the points when said converting device is mounted on each of said game machines, or including the identification-information and the play-information when said converting device is mounted on said server, said server comprising:
- a point storage device for storing the points converted by the converting device and the identification-information associating with the points so as to correspond with each other;
- an updating device for updating the points in the point storage device by adding the points converted by the converting device;
- a trading device for trading the points stored in the point storage device for any one of a plurality of game elements, each of which is used uniquely in any one of the games; and
- a second sending device for sending the traded game element to said game machine operated by the user associated with the traded points.

2. The game system according to claim 1, wherein said server comprises:
- a data storage device for storing user available data that the identification-information and at least one of the plurality of game elements available to the user are associated with each other; and
- a storage control device for, when said server receives a trading request to trade anyone of the plurality of game elements together with the identification-information, updating the points, corresponding to the received identification-information in said point storage device, to a value obtained by subtracting points corresponding to the game element to be traded, and
- said trading device allows the game element to be traded to be reflected in the user available data corresponding to the received identification-information in said data storage device.

3. The game system according to claim 2, wherein said point storage device further stores authentication information for verifying the user in association with the identification-information and the points; and
- said trading device and said storage control device update the points stored in said point storage device and the user available data stored in said data storage device according to the trading request, in the case where the user is authenticated as a proper user based on the authentication information.

4. The game system according to claim 2,
wherein, when anyone of designating informations, each of which designates anyone of the plurality of game elements, and the identification-information are sent in association with each other from said game machine to said server, when the user available data that the game element designated by the sent designating information is associated with the sent identification-information is stored in said data storage device, said second sending device sends the designated game element to said game machine.

5. The game system according to claim 4, wherein said data storage device comprises:
- a first storage device for storing the plurality of game elements and the designating informations, each of which designates each of the plurality of game elements so to be associated with each other; and
- a second storage device for storing the designating informations, each of which designates the game element available to the user among the designating informations stored in said first storage device, and the identification-information so as to be associated with each other; and
- when said server receives the identification-information from said game machine, said second sending device reads the designating informations stored in association with the received identification-information from said second storage device and sends the read designating informations to said game machine, and, when said server receives a designating information selected among the sent designating informations from said game machine, said second sending device reads the game element stored in association with the received designating information from said first storage device and sends the read game element to said game machine.

6. The game system according to claim 2,
wherein the identification-information is an individual identification-information to identify the user for each kind of the games,
said data storage device comprises an individual storage device controlled for each kind of the games, and said individual storage device stores individual available data that the individual identification-information and at least one of the plurality of game elements available to the user are associated with each other, and
when said server receives a common identification-information issuing request including common identification-information to link the individual identification-informations corresponding to a same user and the individual identification-informations to be linked, said storage control device stores the received common identification-information and the received individual identification-informations so as to be associated with each other in said point storage device.

7. The game system according to claim 6,
wherein said game machine comprises a readout device for reading out the individual identification-information from an information storage medium storing anyone of the individual identification-informations, and said first sending device sends the individual identification-information read out by said readout device to said server.

8. A server for communicating with a plurality of game machines configured for playing different kinds of games from each other, comprising:
- a converting device for converting play-information indicating the contents of a user's playing in each game on each of said game machines to points in accordance with the contents of the play-information, the points having a trading value unified throughout the games and are tradeable for game elements to be used uniquely in one of the games,
- a point storage device for storing identification-information for identifying a user and the points converted by the converting device so as to correspond with each other, an updating device for updating the points in the point storage device by adding the points converted by the converting device;

a storage control device which, upon reception of the identification-information and the play-information from said game machine, allows the converted points to be reflected in the points stored in the point storage device in association with the received identification-information;

a trading device for trading the points stored in the point storage device for anyone of a plurality of game elements, each of which is used uniquely in anyone of the games; and a sending device for sending the traded game element to said game machines operated by the user associated with the traded points.

9. The server according to claim 8, comprising:

a data storage device for storing user available data that identification-information and at least one of the plurality of the game elements available to the user are associated with each other; and said storage control device which, upon reception of a trading request to trade anyone of the plurality of game elements together with the identification-information, updates the points, corresponding to the received identification-information in said point storage device, to a value obtained by subtracting points corresponding to the game element to be traded, and said trading device allows the game element to be traded to be reflected in the user available data corresponding to the received identification-information in said data storage device.

10. The server according to claim 9, wherein when anyone of designating informations, each of which designates anyone of the plurality of game elements, and the identification-information are sent in association with each other from said game machine to said server, in the case where the user available data that the game element designated by the sent designating information is associated with the sent identification-information is stored in said data storage device, said sending device sends the designated game element to said game machine.

11. The server according to claim 10, wherein said data storage device comprises:

a first storage device for storing the plurality of game elements and the designating informations, each of which designates each of the plurality of game elements so as to be associated with each other, and a second storage device for storing the designating informations, each of which designates the game element available to the user among the designating informations stored in said first storage device, and the identification-information so as to be associated with each other, and upon reception of the identification-information from said game machine, said sending device reads the designating informations stored in association with the received identification-information from said second storage device and sends the read designating informations to said game machine, and, upon reception of a designating information selected among the sent designating informations from said game machine, said sending device reads the game element stored in association with the received designating information from said first storage device and sends the read game element to said game machine.

12. The server according to claim 9, wherein the identification-information is an individual identification-information to identify the user for each kind of the games, said data storage device comprises an individual storage device controlled for each kind of the games, and said individual storage device stores individual available data that the individual identification-information and at least one of the plurality of game elements available to the user are associated with each other, and when said server receives a common identification-information issuing request including common identification-information to link the individual identification-informations corresponding to a same user and the individual identification-informations to be linked, said storage control device stores the received common identification information and the received individual identification-informations so as to be associated with each other in said point storage device.

13. A register terminal connected via a communication network with a server included in a game system where a plurality of game machines are included, each of the game machines configured for communicating with the server and playing different kinds of games from each other, wherein:

one of each of said game machines each or said server comprises a converting device for converting play-information indicating the contents of a user's playing in each game on each of said game machines into points in accordance with the contents of the play-information, the points having a trading value unified throughout the games and are tradeable for game elements to be used uniquely in one of the games, and the server has a point storage device for storing so as to be associated with each other, each individual identification-information to identify a user for each game, common identification-information to link the individual identification-informations corresponding to a same user, and the points given to the user, and a storage control device for, when the server receives a common identification, issuing request including the common identification-information and the individual identification-informations to be linked, storing in the point storage device, the received common identification-information and the received individual identification-informations so as to be associated with each other, the server further includes an updating device for updating the points in the point storage device by adding the points converted by converting device;

said register terminal comprising:

a readout device for reading out the individual identification-information from an information storage medium storing anyone of the individual identification-informations;

an input device for inputting the common identification-information; and a sending device for sending the common identification-information input by said input device and the read out individual identification-information to said server.

14. A method for a game system including a plurality of different games and a user, comprising:

converting play-information indicating the contents of the user playing one of the plurality of games into points, the points having a trading value unified through the games and tradeable for game elements to be used uniquely in one of the games;

awarding points to the user for playing at least one of the plurality of games;

storing said points with corresponding identification-information used to identify the user;

setting a trading value for said points, which is unified throughout the plurality of different games; and trading said points for anyone of a plurality of game elements, wherein each of said game elements is used uniquely in anyone of the plurality of games.

15. The system of claim 1, wherein the converting device converts the play-information indicating the contents of the user's playing in each game into common points in accordance both with the contents of the play-information and a conversion rule for the game, the common points thereby having a unified trading value that enable the trading for any one of the plurality of game elements used uniquely in any one of the games.

16. The server of claim 8, wherein the converting device converts the play-information indicating the contents of the user's playing in each game into common points in accordance both with the contents of the play-information and a conversion rule for the game, the common points thereby having a unified trading value that enable the trading for any one of the plurality of game elements used uniquely in any one of the games.

17. The register terminal of claim 13, further comprising:

a display configured for displaying an authentication response from the server and an indication of a total number of common points currently available to the user, wherein the common points are provided by the converting device, which converts the play-information indicating the contents of the user's playing in each game into common points in accordance both with the contents of the play-information and a conversion rule for the game, the common points thereby having a unified trading value that enable the trading for any one of the plurality of game elements used uniquely in any one of the games.

18. The method of claim 14, wherein the converting step converts play-information indicating the contents of the user's playing in the one game into common points in accordance both with the contents of the play-information and a conversion rule for the game, the common points thereby having a unified trading value that enable the step of trading for any one of the plurality of game elements used uniquely in any one of the games.

\* \* \* \* \*